(12) United States Patent
Buttgenbach et al.

(10) Patent No.: US 11,831,161 B2
(45) Date of Patent: Nov. 28, 2023

(54) SYSTEMS AND METHODS UTILIZING AC OVERBUILT RENEWABLE ELECTRIC GENERATION RESOURCE AND CHARGE STORAGE DEVICE PROVIDING DESIRED CAPACITY FACTOR

(71) Applicant: 8ME NOVA, LLC, San Francisco, CA (US)

(72) Inventors: Thomas Buttgenbach, Los Angeles, CA (US); Lukas Hansen, El Dorado Hills, CA (US); Philippe Garneau-Halliday, Oakland, CA (US); Emily Arnold, Oakland, CA (US)

(73) Assignee: 8ME NOVA, LLC, San Francisco, CA (US)

( * ) Notice: Subject to any disclaimer, the term of this patent is extended or adjusted under 35 U.S.C. 154(b) by 294 days.

(21) Appl. No.: 17/360,080

(22) Filed: Jun. 28, 2021

(65) Prior Publication Data

US 2022/0052525 A1    Feb. 17, 2022

Related U.S. Application Data

(63) Continuation of application No. 17/120,006, filed on Dec. 11, 2020, now Pat. No. 11,081,887.
(Continued)

(51) Int. Cl.
*H02J 3/00* (2006.01)
*H02S 10/20* (2014.01)
(Continued)

(52) U.S. Cl.
CPC ............ *H02J 3/007* (2020.01); *G05B 19/042* (2013.01); *G06Q 10/04* (2013.01); *G06Q 50/06* (2013.01);
(Continued)

(58) Field of Classification Search
CPC .... H02J 3/007; H02J 3/004; H02J 3/32; H02J 3/381; H02J 2300/24; H02J 2300/28;
(Continued)

(56) References Cited

U.S. PATENT DOCUMENTS

| 7,679,215 B2 | 3/2010 | Delmerico et al. |
| 7,800,247 B2 | 9/2010 | Chang et al. |

(Continued)

FOREIGN PATENT DOCUMENTS

| CN | 1639942 A | 7/2005 |
| CN | 103256175 | 8/2013 |

(Continued)

OTHER PUBLICATIONS

XP093022533A, What is Inverter Capacity? Inverter Continuous Capacity Solar365 (2023) http://www.solar365.com/solar/photovoltaic/what-is-inverter-capacity#:~:text=Inverter%20capacity%20is%20the%20amount,wired%20for%20the%20required%20capacity Feb. 9, 2023.
(Continued)

*Primary Examiner* — Mohammad Ali
*Assistant Examiner* — Kelvin Booker
(74) *Attorney, Agent, or Firm* — Foley & Lardner LLP

(57) ABSTRACT

An integrated renewable energy source (RES) and energy storage system (ESS) facility configured to supply power to an AC electrical grid includes energy storage system capacity and inverter capacity that are larger than a point of grid interconnect (POGI) limit for the facility, enabling high capacity factors and production profiles that match a desired load. At least one first DC-AC power inverter is associated with RES, and at least one second AC-DC power inverter is associated with the ESS. AC-DC conversion is used when charging the ESS with RES AC electric power, and DC-AC conversion utility is used when discharging ESS AC electric power to the electric grid. Aggregate DC-AC inverter utility
(Continued)

exceeds the facility POGI limit, and excess RES AC electric power may be diverted to the second inverter(s).

21 Claims, 14 Drawing Sheets

Related U.S. Application Data

(60) Provisional application No. 63/020,009, filed on May 4, 2020.

(51) Int. Cl.

| | |
|---|---|
| *H02S 40/38* | (2014.01) |
| *G06Q 10/04* | (2023.01) |
| *G06Q 50/06* | (2012.01) |
| *H02J 3/32* | (2006.01) |
| *G05B 13/02* | (2006.01) |
| *G05B 19/04* | (2006.01) |
| *H02S 50/00* | (2014.01) |
| *G05B 19/042* | (2006.01) |
| *H02J 3/38* | (2006.01) |

(52) U.S. Cl.
CPC .............. *H02J 3/004* (2020.01); *H02J 3/32* (2013.01); *H02J 3/381* (2013.01); *H02S 10/20* (2014.12); *H02S 40/38* (2014.12); *H02S 50/00* (2013.01); *G05B 13/02* (2013.01); *G05B 19/04* (2013.01); *G05B 2219/25252* (2013.01); *H02J 2300/24* (2020.01); *H02J 2300/28* (2020.01)

(58) Field of Classification Search
CPC ........... H02J 13/00001; H02J 13/00004; H02J 3/008; H02J 7/00712; H02J 7/35; G05B 19/042; G05B 13/02; G05B 19/04; G05B 2219/25252; G06Q 10/04; G06Q 50/06; H02S 10/20; H02S 40/38; H02S 50/00; H02S 10/00; Y02E 40/70; Y02E 60/00; Y02E 10/56; Y02E 70/30; Y04S 10/123; Y04S 50/10; Y04S 10/14; Y04S 10/40; Y04S 10/50; Y02P 90/50

See application file for complete search history.

(56) References Cited

U.S. PATENT DOCUMENTS

| | | | |
|---|---|---|---|
| 8,373,302 | B1 | 2/2013 | Witters |
| 8,692,419 | B2 | 4/2014 | Fortmann et al. |
| 8,773,076 | B2 | 7/2014 | Choi et al. |
| 9,466,984 | B2 | 10/2016 | Cardinal et al. |
| 9,559,521 | B1 | 1/2017 | King |
| 9,811,064 | B2 | 11/2017 | Carlson et al. |
| 9,929,571 | B1 | 3/2018 | Dao et al. |
| 10,254,780 | B2 | 4/2019 | Lee et al. |
| 10,326,280 | B1 | 6/2019 | Sarwat et al. |
| 10,333,390 | B2 * | 6/2019 | Li .................... H02M 1/126 |
| 10,601,227 | B2 | 3/2020 | Johansson et al. |
| 10,686,369 | B1 | 6/2020 | Motoyama |
| 10,901,383 | B2 | 1/2021 | Wong et al. |
| 10,909,642 | B2 | 2/2021 | Eibsat et al. |
| 11,031,781 | B1 | 6/2021 | Zanone et al. |
| 11,043,809 | B1 | 6/2021 | Akyol et al. |
| 11,081,887 | B1 | 8/2021 | Buttgenbach et al. |
| 11,387,654 | B2 | 7/2022 | Gadh et al. |
| 11,588,329 | B2 | 2/2023 | Zanone et al. |
| 2003/0090233 | A1 | 5/2003 | Browe |
| 2007/0159866 | A1 * | 7/2007 | Siri .................... H02M 7/53803 363/95 |
| 2008/0102329 | A1 | 5/2008 | Hollinger |
| 2009/0295227 | A1 | 12/2009 | Chang et al. |
| 2010/0127664 | A1 | 5/2010 | Paice et al. |
| 2010/0222935 | A1 | 9/2010 | Forbes, Jr. et al. |
| 2011/0004357 | A1 | 1/2011 | Mathiowetz |
| 2011/0060474 | A1 | 3/2011 | Schmiegel et al. |
| 2011/0140520 | A1 | 6/2011 | Lee |
| 2011/0140648 | A1 | 6/2011 | Lee |
| 2011/0148195 | A1 | 6/2011 | Lee |
| 2011/0172837 | A1 | 7/2011 | Forbes, Jr. |
| 2011/0215640 | A1 * | 9/2011 | Donnelly .................. H02J 1/10 307/21 |
| 2011/0227417 | A1 | 9/2011 | Walker |
| 2011/0276269 | A1 | 11/2011 | Hummel |
| 2011/0316346 | A1 | 12/2011 | Porter et al. |
| 2012/0200264 | A1 | 8/2012 | Choi et al. |
| 2012/0228939 | A1 | 9/2012 | Kaga et al. |
| 2012/0239214 | A1 | 9/2012 | Nakashima et al. |
| 2012/0239219 | A1 | 9/2012 | Forbes, Jr. |
| 2012/0326511 | A1 | 12/2012 | Johnson |
| 2013/0184884 | A1 | 7/2013 | More et al. |
| 2013/0241495 | A1 | 9/2013 | Min |
| 2014/0148963 | A1 | 5/2014 | Ozog |
| 2014/0222225 | A1 | 8/2014 | Rouse et al. |
| 2014/0257585 | A1 | 9/2014 | Kubota et al. |
| 2014/0297051 | A1 | 10/2014 | Zhang et al. |
| 2014/0306533 | A1 | 10/2014 | Paquin et al. |
| 2015/0008737 | A1 | 1/2015 | Mao |
| 2015/0008864 | A2 | 1/2015 | Wolter |
| 2015/0028794 | A1 * | 1/2015 | Flett ........................ H02J 3/381 320/101 |
| 2015/0115715 | A1 | 4/2015 | Chung et al. |
| 2015/0153756 | A1 | 6/2015 | Marcus |
| 2015/0354545 | A1 | 12/2015 | Conlon |
| 2015/0364919 | A1 * | 12/2015 | Schumer .................. H02J 3/28 700/291 |
| 2016/0028271 | A1 | 1/2016 | Smith |
| 2016/0190812 | A1 | 6/2016 | Myer |
| 2016/0329719 | A1 | 11/2016 | Meyer et al. |
| 2016/0334848 | A1 | 11/2016 | Carlson |
| 2016/0344212 | A1 * | 11/2016 | Murano .................. H02J 3/381 |
| 2016/0370819 | A1 | 12/2016 | Forbes, Jr. |
| 2016/0380460 | A1 | 12/2016 | Dominguez Amarillo et al. |
| 2017/0005515 | A1 | 1/2017 | Sanders et al. |
| 2017/0102162 | A1 | 4/2017 | Drees et al. |
| 2017/0102434 | A1 | 4/2017 | Wenzel et al. |
| 2017/0102675 | A1 | 4/2017 | Drees |
| 2017/0104336 | A1 | 4/2017 | Elbsat et al. |
| 2017/0117716 | A1 | 4/2017 | Wolter |
| 2017/0160711 | A1 | 6/2017 | Wong et al. |
| 2017/0168516 | A1 * | 6/2017 | King ........................ H02J 3/32 |
| 2017/0256952 | A1 | 9/2017 | Sugahara et al. |
| 2017/0302081 | A1 | 10/2017 | Walliser et al. |
| 2017/0338651 | A1 * | 11/2017 | Fishman .................. H02J 3/50 |
| 2018/0069416 | A1 | 3/2018 | Brace et al. |
| 2018/0196456 | A1 | 7/2018 | Elbsat |
| 2018/0197252 | A1 | 7/2018 | Bollermann et al. |
| 2018/0197253 | A1 | 7/2018 | Elbsat et al. |
| 2018/0224814 | A1 | 8/2018 | Elbsat et al. |
| 2018/0245485 | A1 | 8/2018 | Conlon |
| 2018/0254632 | A1 | 9/2018 | Elbsat et al. |
| 2018/0262005 | A1 | 9/2018 | Lazaris |
| 2018/0314220 | A1 | 11/2018 | Kumar et al. |
| 2018/0322591 | A1 | 11/2018 | Bellissima et al. |
| 2018/0331543 | A1 | 11/2018 | Palombini et al. |
| 2018/0356770 | A1 | 12/2018 | Elbsat et al. |
| 2018/0356782 | A1 | 12/2018 | Elbsat et al. |
| 2018/0357577 | A1 | 12/2018 | Elbsat et al. |
| 2018/0366978 | A1 | 12/2018 | Matan et al. |
| 2019/0036340 | A1 | 1/2019 | Meeker et al. |
| 2019/0036482 | A1 | 1/2019 | Jin et al. |
| 2019/0052088 | A1 | 2/2019 | Johansson et al. |
| 2019/0052092 | A1 | 2/2019 | Palombini et al. |
| 2019/0066236 | A1 | 2/2019 | Wenzel |
| 2019/0079473 | A1 | 3/2019 | Kumar et al. |
| 2019/0109461 | A1 | 4/2019 | Khajehoddin et al. |
| 2019/0115761 | A1 | 4/2019 | Palombini et al. |
| 2019/0146537 | A1 | 5/2019 | Forbes, Jr. |
| 2019/0206000 | A1 | 7/2019 | Elbsat et al. |
| 2019/0217739 | A1 | 7/2019 | Sinha et al. |
| 2019/0303830 | A1 | 10/2019 | Wenzel et al. |
| 2019/0305551 | A1 | 10/2019 | Ley et al. |
| 2019/0324487 | A1 | 10/2019 | Elbsat et al. |

(56) References Cited

U.S. PATENT DOCUMENTS

| | | | |
|---|---|---|---|
| 2019/0340709 | A1 | 11/2019 | Elbsat et al. |
| 2020/0028363 | A1 | 1/2020 | Farrokhabadi et al. |
| 2020/0059099 | A1 | 2/2020 | Turena et al. |
| 2020/0073342 | A1 | 3/2020 | Lee et al. |
| 2020/0076196 | A1 | 3/2020 | Lee et al. |
| 2020/0176985 | A1 | 6/2020 | Habib et al. |
| 2020/0177409 | A1 | 6/2020 | Galchenko et al. |
| 2020/0193345 | A1 | 6/2020 | Elbsat et al. |
| 2020/0193346 | A1 | 6/2020 | Elbsat et al. |
| 2020/0193532 | A1 | 6/2020 | Elbsat et al. |
| 2020/0259358 | A1 | 8/2020 | Hansen et al. |
| 2020/0336003 | A1 | 10/2020 | Narla et al. |
| 2020/0341500 | A1* | 10/2020 | Tyler ............... H02J 3/381 |
| 2021/0006073 | A1 | 1/2021 | Donahue et al. |
| 2021/0305813 | A1 | 9/2021 | Lucas et al. |
| 2022/0102978 | A1 | 3/2022 | Farrokhabadi et al. |
| 2022/0385101 | A1 | 12/2022 | Caamano et al. |

FOREIGN PATENT DOCUMENTS

| | | |
|---|---|---|
| CN | 106786804 | 5/2017 |
| CN | 107302226 A | 10/2017 |
| CN | 108432117 | 8/2018 |
| CN | 109390942 | 2/2019 |
| CN | 109478787 | 3/2019 |
| CN | 109804519 A | 5/2019 |
| DE | 102017203249 A1 | 8/2018 |
| EP | 2 270 331 A3 | 1/2011 |
| JP | 2009-268247 | 11/2009 |
| JP | 2015-167461 | 9/2015 |
| JP | 2016-063637 | 4/2016 |
| JP | 2016-127634 | 7/2016 |
| JP | 2017-055565 | 3/2017 |
| JP | 2017-055598 | 3/2017 |
| JP | 2019-004548 | 1/2019 |
| JP | 2019-115233 | 7/2019 |
| JP | 2020-022241 | 2/2020 |
| TW | 201230598 | 7/2012 |
| TW | 201310876 A | 3/2013 |
| TW | 201639265 | 11/2016 |
| WO | WO-2013/118266 A1 | 8/2013 |
| WO | WO-2014/136362 | 9/2014 |
| WO | WO-2015/106814 | 7/2015 |
| WO | WO-2015139061 A1 | 9/2015 |
| WO | WO-2017/062905 A1 | 4/2017 |
| WO | WO-2020/016808 | 1/2020 |
| WO | WO-2021225632 A1 | 11/2021 |
| WO | WO-2021225633 A1 | 11/2021 |
| WO | WO-2021225634 A1 | 11/2021 |

OTHER PUBLICATIONS

Proceedings of the 29th European Photovoltaic Solar Energy Conference and Exhibition, Wiprenewable Energies, Sylvensteinstr. 2 81369 Munich, Germany, Nov. 3, 2014 (Nov. 3, 2014), XP040678389, ISBN: 978-3-936338-34-8.

Ahmad, A et al., "An Optimized Home Energy Management System with Integrated Renewable Energy and Storage Resources," Energies, vol. 10, No. 549, Apr. 2017, MDPI, 35 pages.

Albuquerque et al., "Photovoltaic solar system connected to the electric power grid operating as active power generator and reactive power compensator", 2009, The 8th Latin-American Congress on Electricity Generation Andtransmission. (Year: 2009).

Algaddafi et al., "An Optimal Current Controller Design for a Grid Connected Inverter to Improve Power Quality and Test Commercial PV Inverters", Dec. 2016, The Scientific World Journal, vol. 2017, Article ID 1393476, 13 pages. (Year: 2016).

Arnold et al., "Model Predictive Control of Energy Storage including Uncertain Forecasts", Jan. 2011, 17th Power Systems Computation Conference (PSCC 2011). (Year: 2011).

Author Unknown, "2018 Total System Electric Generation," California Energy Commission, 2019, 8 pages.

Callafon et al., "Scheduling of Dynamic Electric Loads Using Energy Storage and Short Term Power Forecasting", Sep. 2016,2016 IEEE Conference on Control Applications (CCA) Part of 2016 IEEE Multi-Conference on Systems and Control. (Year: 2016).

Co-pending U.S. Appl. No. 17/325,031, inventors Zanone; Leigh et al., filed May 19, 2021.

Co-pending U.S. Appl. No. 17/339,802, inventors Aykol; Bora et al., filed Jun. 4, 2021.

Huang, Y. et al., "ASEAN grid flexibility: Preparedness for grid integration of renewable energy," Energy Policy, vol. 128, May 2019, Elsevier, 17 pages.

Jeon et al., "Power Control of a Grid-Connected Hybrid Generation System with PhotoNoltaic/Wind/Turbine/Battery Sources",Oct. 2007, 7th Intl Conf on Power Electronics. (Year: 2007).

Jha et al., "Grid Integration of Renewable Energy Sources", 2015, Journal of Scientific and Technical Advancements, vol. 1,Issue 3, pp. 1-5. (Year: 2015).

Nan et al., "Model-Predictive Direct Power Control of Grid-Connected Inverters for PV Systems", Oct. 2015, International Conference on Renewable Power Generation (RPG 2015). (Year: 2015).

PCT/US2020/065347 International Search Report and Written Opinion dated Mar. 31, 2021.

PCT/US2020/065354 International Search Report and Written Opinion dated Mar. 23, 2021.

PCT/US20/65346 International Search Report and Written Opinion dated Mar. 12, 2021.

Quayle Action and Interview Summary for U.S. Appl. No. 17/120,027, dated Feb. 26, 2021, 18 pages.

Rizqiawan et al., "Development of Grid-Connected Inverter Experiment Modules for Microgrid Learning", 2019, Energies, 12, 476. Year: 2019.

Sankar et al., "Flexible Power Regulation of Grid-Connected Inverters for PV Systems Using Model Predictive Direct Power Control", Dec. 2016, Indonesian Journal of Electrical Engineering and Computer Science, vol. 4, No. 3. (Year: 2016).

Sarina Adhikari, "Control of Solar Photovoltaic (PhV) Power Generation In Grid-connected and Islanded Microgrids", May 2013,Doctor of Philosophy Degree The University of Tennessee, Knoxville. (Year: 2013).

U.S. Appl. No. 17/120,006 Notice of Allowance dated Jun. 21, 2021.

U.S. Appl. No. 17/120,006 Notice of Allowance dated Mar. 5, 2021.

U.S. Appl. No. 17/120,019 Notice of Allowance dated Apr. 30, 2021.

U.S. Appl. No. 17/120,019 Notice of Allowance dated Mar. 31, 2021.

U.S. Appl. No. 17/120,027 Notice of Allowance dated Apr. 21, 2021.

U.S. Appl. No. 17/120,027 Notice of Allowance dated Mar. 12, 2021.

Singh et al., "Optimal Power Scheduling of Renewable Energy Systems in Microgrids using Distributed Energy Storage System," (2016) IET Renewable Power Generation, vol. 10, Issue 9, pp. 1328-1339.

Taiwan Office Action on TW Patent Appl. No. 110115965 dated Jan. 7, 2022.

Taiwan Office Action on TW Patent Appl. No. 110137721 dated Jan. 7, 2022.

Agency for Natural Resources and Energy, Reference Document 2, Actions to be Taken for Relaxation of System Constraints, 2nd Meeting of Advisory Committee for Natural Resources and Energy, Energy Conservation and New Energy Working Group/Electricity and Gas Industry Working Group, Subcommittee of Mass-introduction of Renewable Energy and Next-Generation Power Network, Japan, Agency for Natural Resources and Energy, Jan. 24, 2018, pp. 11-22, https://www.meti.go.jp/shingikai/enecho/denryoku_g.

* cited by examiner

SYSTEMS AND METHODS UTILIZING AC OVERBUILT RENEWABLE ELECTRIC GENERATION RESOURCE AND CHARGE STORAGE DEVICE PROVIDING DESIRED CAPACITY FACTOR

CROSS-REFERENCE TO RELATED APPLICATION(S)

This application is a continuation of U.S. patent application Ser. No. 17/120,006, filed Dec. 11, 2020, which claims priority to U.S. Provisional Patent Application No. 63/020,009 filed on May 4, 2020, wherein the entire disclosure of the foregoing application is hereby incorporated by reference herein.

TECHNICAL FIELD

Subject matter herein relates to an integrated renewable electrical energy generation resource and energy storage facility configured to supply an aggregated power output to an electrical grid, as well as methods for controlling such a facility and implementing power delivery transactions for potential energy outputs of such a facility.

BACKGROUND

A substantial increase of renewable electric generation resources, such as solar photovoltaic (PV) and wind power generators, has taken place in recent years. The unsteady nature of solar and wind generation due to natural and meteorological conditions can result in network frequency and voltage deviations. As renewable electric generation resources start to provide a greater percentage of electrical supply and displace traditional base-load electrical generation units such as coal-fired and nuclear-powered units, technical challenges are introduced, such as grid interconnection, power quality, reliability, stability, protection, and generation dispatch and control. The intermittent nature of solar and wind generation and rapid fluctuation in their output make their combination with energy storage devices (such as a battery energy storage system or BESS) attractive to enhance compatibility with electrical grids, such as to smooth fluctuations and enhance predictability of energy supplied to a grid from a renewable generation resource. Conventional renewable energy resources have relatively low capacity factors roughly tied to the capacity factor of the resource (e.g., for solar typically 20% to 40% depending on location and weather pattern). When renewable energy resources replace traditional fossil-fired baseload power plants, they under-utilize existing transmission infrastructure. This may require building new transmission infrastructure, which is costly, time-consuming, and challenging (e.g., including the need to obtain permitting), thereby increasing costs per megawatt-hour produced, delays, and risk in incorporating renewable generation into existing grids.

Co-locating renewable electric generation and electrical energy storage devices may provide cost savings by reducing costs related to site preparation, land acquisition, permitting, interconnection, installation labor, hardware, and overhead. Additionally, tax savings may result, typically if the electrical energy storage devices are subject to being charged exclusively from on-site renewable electric generation resources, and co-location of generation and storage device also minimizes transmission losses therebetween.

Energy storage devices may be used to support arbitrage, which involves charging a storage device during hours when energy prices are low, and discharging a storage device during hours during more expensive peak demand hours. Energy storage devices may also be used to promote load-leveling, to more efficiently coordinate the dispatch of multiple generation resources.

To illustrate the principles of smoothing production variations and arbitrage, reference is made to FIG. 1, which is an output plot for a conventional RES-ESS facility (including a photovoltaic (PV) array and a BESS), showing superimposed plots of PV production, combined PV plus BESS output, and BESS state of charge (SOC) for hours of 06:00 to 22:00 for one day. As shown, PV output starts around 07:00, increases to a maximum value near 12:00, and decreases to zero around 17:00, with significant fluctuation in PV output. Since some of the PV output is used to charge the BESS (i.e., increase the SOC), amplitude variations of the combined PV plus BESS output are significantly attenuated in comparison to the PV output. Additionally, energy stored in the BESS is discharged between 17:00 and 21:00, enabling shifting of sales from mid-day power production to evening hours when energy prices are higher than during the day. Despite the benefits of production variation smoothing and arbitrage provided by the PV array and BESS utilized in FIG. 1, the combined PV plus BESS output still exhibit very significant variation during a calendar day, such that the PV plus BESS system is not suitable for providing a high level of fixed firm capacity for a long duration.

Various considerations may affect utilization of a BESS. Lithium-based batteries can degrade at an accelerated rate when at or near a full charge capacity. Grid operators seeking to dispatch an integrated renewable electric generation and charge storage facility may require attainment of specific battery state of charge (SOC) conditions at particular times in a given day (with SOC being generally defined as the percentage of the full capacity of a battery that is still available for further discharge). Once a battery is at 100% SOC, it is also unable to absorb rapid increases in electric power output of an associated renewable electric generation resource, such that any excess power generation not able to be accepted by an electrical grid may undesirably need to be curtailed (e.g., by clipping in a power inverter).

Further considerations that may affect utilization of a BESS include the ability to provide (and the ability to be compensated for providing) ancillary services. Ancillary services help grid operators maintain a reliable electricity system by ensuring that frequency, voltage, and power load remain within certain limits. Classes of ancillary services include frequency maintenance (e.g., to address requirements for spinning reserve, energy balancing, and sheddable loads), voltage compensation (e.g., to address power factor correction and energy losses/dissipation due to energy transport), operational management (e.g., to address grid monitoring, feed-in management, and redispatch), and reconstruction of supply (e.g., to facilitate rapid restarting of a power grid in case of a blackout). The variability and uncertainty of renewable energy resources (e.g., wind and solar generation) increases the requirements for various ancillary services, thereby affecting the scheduling and pricing of those services. If renewable energy producers are rewarded for energy generation alone, however, these producers may be discouraged from providing ancillary services.

The transmission and distribution infrastructure of an electricity grid must be sized to meet peak demand, which may only occur over a few hours of a year. When anticipated growth in peak electricity demand exceeds the existing capacity of the electricity grid, costly investments are needed to upgrade equipment and develop new infrastructure.

An electrical energy generation resource may be coupled with transmission resources of an electrical grid at a point of grid interconnection (POGI), typically at a voltage of at least 33 kV or at least 66 kV suitable for transmission of electric power over long distances with acceptably low transmission losses. To ensure reliability and avoid damage to transmission resources, a POGI limit (representing a maximum power that may be supplied to a transmission resource) is established for each electrical energy generation resource. To increase the revenue potential from a photovoltaic energy generation resource for associated transmission resources of a predetermined cost, it is commonplace for the aggregate output of a photovoltaic array to be oversized relative to a POGI limit, since peak photovoltaic generation may only be infrequently achieved (e.g., due to factors such as unfavorable weather conditions, solar conditions, panel cleanliness conditions, PV panel aging, and high ambient air temperatures that reduce PV panel output). This oversizing of a photovoltaic array enables an increased amount of power to be sold over the course of a year, but also increases the need to curtail excess power (e.g., by inverter clipping) during peak irradiance periods. In order to avoid damage to transmission resources, however, interconnection procedures promulgated by the Federal Energy Regulatory Commission (FERC) and rules provided in the corresponding Large Generator Interconnection Agreement (LGIA) permit power supplied to a transmission system to exceed a point of grid interconnect by a small technical tolerance of typically no greater than 2%. These rules protect an electric grid from failure (e.g., due to overloading of circuits, transmission lines, and transformers, or triggering circuit breakers to disconnect an over-generating facility. Compliance with such rules is typically assured by providing inverters between a photovoltaic array and a transmission system that have a total output capacity equal to the POGI limit, plus a small allowance for electrical losses between the inverters and the grid interconnection point.

In power purchase agreements for facilities that include utility scale renewable generation sources paired with energy storage systems, the utility energy buyer commonly requires that the utility retain the rights to determine the charge and discharge signals for the energy storage system. Thus, the utility's operating decisions would affect total generation output and revenue producing capability of the RES-ESS facility, in ways that may not have been expected during the original planning for the project. Yet in the power purchase agreements for such facilities, the capital expenses for developing the projects are typically amortized over the expected generation, and investors of these projects prefer certainty in the expected generation in order to contribute capital for project funding.

Conventional renewable generation resources have had capacity factors and load matching capability (e.g., timing) tied to availability of the driving resource (e.g., solar irradiance or wind). Due to their low capacity factors and limited time availability, conventional renewable generation resources underutilize transmission resources. This is a significant problem for utilities due to the cost and difficulty of expanding transmission resources.

In view of the foregoing, need exists for improved renewable electrical energy generation resource and energy storage facilities, as well as methods for controlling such facilities and for implementing power delivery transactions for outputs of such as facility.

SUMMARY

The present disclosure relates in various aspects to an integrated renewable electrical energy generation resource and energy storage system (RES-ESS) facility configured to supply an aggregated power output to an alternating current (AC) electrical grid, as well as methods for controlling such a facility and implementing power delivery transactions for potential energy outputs of such a facility. The RES-ESS facility may be referred to as an "AC overbuilt" facility, with ESS capacity and RES inverter capacity being larger than conventional facilities, and with RES inverter capacity being larger than a point of grid interconnect (POGI) limit for the facility. Systems and methods disclosed herein enable high capacity factors and production profiles that match a desired load. A degree of oversizing may be selected at the time of design and construction to permit an AC-overbuilt RES-ESS facility to provide a fixed firm capacity for a desired capacity and duration, thereby permitting a RES-ESS facility to emulate (and serve as) a baseload power station. This capability represents a fundamental shift relative to the conventional utilization of renewable energy resources involving significant output fluctuation and limited load matching capabilities, by permitting a RES-ESS facility to serve as a grid-tied renewable electric baseload generator.

In an AC overbuilt RES-ESS facility as described herein, the RES is configured to produce direct current (DC) electric power, and the ESS is configured to be charged with, and to discharge, DC electric power. At least one first power inverter associated with the RES is configured to convert RES DC electric power to RES AC electric power, and at least one second power inverter associated with the ESS is configured to provide AC-DC conversion utility when charging the ESS with RES AC electric power and to provide DC-AC conversion utility when discharging the ESS AC electric power to the electric grid. An aggregate output capacity of the at least one first power inverter is sized to exceed the POGI limit for the facility, with the facility being configured to cause RES AC electric power to be diverted (or otherwise provided) to the least one second power inverter to avoid supplying RES AC electric power to the electric grid in excess of the POGI limit. A method for controlling a RES-ESS facility comprises using a time-dependent forecast of electrical energy production by the RES and a state of charge (SOC) schedule for the ESS to calculate a SOC target-based POGI cap that is less than the (predetermined fixed) POGI limit, with the SOC target-based POGI cap representing a peak power output value for the RES-ESS facility that is as low as possible while still ensuring that the SOC schedule is satisfied. The method further comprises using the SOC target-based POGI cap in conjunction with the time-dependent forecast of electrical energy production by the RES and the state of charge (SOC) schedule for the ESS to generate a time-varying charge/discharge control signal for the ESS, with the control signal being configured to ensure satisfaction of the SOC schedule. A method for implementing a power delivery transaction between a buyer and seller for potential electrical energy output of a RES-ESS facility includes periodically estimating total potential electrical energy output of the RES during at least one retrospective time windows utilizing a signal indicative of one or more sensed parameters, comparing the total potential electrical energy output of the RES to a POGI limit for the facility to identify potential RES overgeneration during the time window(s), identifying an amount of charged potential RES overgeneration that was charged to the ESS during the time window(s), and charging the buyer for undelivered electrical energy if charged potential RES overgeneration is less than potential RES overgeneration during the time window(s).

In one aspect, the disclosure relates to an integrated renewable energy source and energy storage system (RES-ESS) facility configured to supply electric power to an electric grid at a grid interconnection point and having a point of grid interconnect (POGI) limit representing a maximum electric power value to be supplied from the RES-ESS facility to the electric grid. In particular, the RES-ESS facility comprises: a renewable energy source (RES) configured to produce electric power, wherein the electric power produced by the RES comprises RES direct current (DC) electric power; at least one first power inverter coupled between the RES and the grid interconnection point, wherein the at least one first power inverter is configured to convert RES DC electric power to RES alternating current (AC) electric power; an energy storage system (ESS) configured to be charged with electric power produced by the RES; and at least one second power inverter coupled (i) between the ESS and the grid interconnection point, and (ii) between the at least one first power inverter and the grid interconnection point, wherein the at least one second power inverter is configured to (a) convert RES AC electric power to ESS DC electric power when charging the ESS with RES AC electric power, and (b) convert ESS DC electric power to ESS AC electric power when discharging the ESS AC electric power to the electric grid; wherein an aggregate output capacity of the at least one first power inverter is sized to exceed the POGI limit; and wherein the RES-ESS facility is configured to divert RES AC electric power to the at least one second power inverter in an amount sufficient to avoid supplying RES AC electric power to the electric grid in excess of the POGI limit In certain embodiments, the aggregate output capacity of the at least one first power inverter is sized to exceed the POGI limit by at least 10%, by at least 30%, by at least 50%, by at least 70%, by at least 100%, or another threshold specified herein, wherein the foregoing minimum thresholds may optionally be capped by the sum of (i) the POGI limit and (ii) a capacity of the ESS. In certain embodiments, the aggregate output capacity of the at least one first power inverter is sized to equal a sum of (i) the POGI limit and (ii) a capacity of the ESS.

In certain embodiments, the RES comprises a photovoltaic array. In certain embodiments, the RES comprises one or more wind turbines.

In certain embodiments, the RES-ESS facility is configured to supply AC electric power to the electric grid at a voltage of at least 33 kV or at least 66 kV.

In another aspect, the disclosure relates to a method for controlling an integrated renewable energy source and energy storage system (RES-ESS) facility configured to supply electric power to an electric grid at a grid interconnection point, the RES-ESS facility including a renewable energy source (RES) and an energy storage system (ESS) chargeable with electric power produced by the RES, and the RES-ESS facility having a point of grid interconnect (POGI) limit. The method comprises: providing at least one first power inverter coupled between the RES and the grid interconnection point, wherein the at least one first power inverter is configured to convert RES DC electric power to RES alternating current (AC) electric power, and an aggregate output capacity of the at least one first power inverter is sized to exceed the POGI limit; providing at least one second power inverter coupled (i) between the ESS and the grid interconnection point, and (ii) between the at least one first power inverter and the grid interconnection point, wherein the at least one second power inverter is configured to (a) convert RES AC electric power to ESS DC electric power when charging the ESS with RES AC electric power, and (b) convert ESS DC electric power to ESS AC electric power when discharging the ESS AC electric power to the electric grid; and while supplying a first portion of the RES AC electric power to the electric grid, diverting a second portion of the RES AC electric power to the at least one second power inverter in an amount sufficient to avoid supplying RES AC electric power to the electric grid in excess of the POGI limit.

In certain embodiments, the method further comprises supplying RES AC electric power to the electric grid at a fixed firm capacity of at least 80% (or at least 90%, or at least 95%, or 100%) of the POGI limit for a duration of at least 6 hours per day, at least 8 hours per day, or at least 12 hours per day, or at least 16 hours per day, or another threshold specified therein. In certain embodiments, the supplying of RES AC electric power to the electric grid for the specified fixed firm capacity and duration is performed for at least 90%, at least 95%, or at least 99% of the days in a specified month or year. In certain embodiments, the RES comprises a photovoltaic array. In certain embodiments, RES AC electric power is supplied to the electric grid at a voltage of at least 33 kV or at least 66 kV (or at least 69 kV).

In another aspect, the disclosure relates to a method for controlling an integrated renewable energy source and energy storage system (RES-ESS) facility configured to supply electric power to an electric grid, the RES-ESS facility including a renewable energy source (RES) and an energy storage system (ESS) chargeable with electric power produced by the RES, and the RES-ESS facility having a point of grid interconnect (POGI) limit. The method comprises: utilizing (A) a time-dependent forecast of electrical energy production by the RES and (B) a state of charge (SOC) schedule to calculate a SOC target-based POGI cap that is less than the POGI limit, wherein the SOC target-based POGI cap represents a peak power output value for the RES-ESS that is as low as possible while still ensuring that the SOC schedule is satisfied; and utilizing (A) the time-dependent forecast of electrical energy production by the renewable electrical energy generation resource, (B) the state of charge (SOC) schedule for the electrical energy storage device including at least one SOC target value, and (C) the SOC target-based POGI cap, to generate a time-varying charge/discharge control signal for the ESS, wherein the time-varying charge/discharge control signal is configured to ensure that the SOC schedule is satisfied.

In certain embodiments, the method further comprises periodically updating the generation of the time-varying charge/discharge control signal based upon at least one of the following items (i) or (ii): (i) an updated time-dependent forecast of electrical energy production; or (ii) an updated SOC schedule.

In certain embodiments, the method further comprises periodically updating the generation of the time-varying control signal upon expiration of a refresh period, wherein the periodic updating comprises computing and using a new basepoint value for aggregated energy supplied from the RES and the ESS to an electrical grid upon expiration of the refresh period.

In certain embodiments, the refresh period is configurable by an operator of the RES-ESS facility.

In certain embodiments, the ESS is charged exclusively from the RES.

In certain embodiments, the method further comprises altering the time-varying charge/discharge control signal responsive to a difference between forecasted production and actual production of at least one electric generation facility to ensure that the SOC schedule is satisfied.

In certain embodiments, the RES comprises a photovoltaic array, the ESS comprises a battery array, and the time-dependent forecast of electrical energy production comprises a solar production forecast.

In certain embodiments, the time-dependent forecast of electrical energy production comprises an ensemble based on of two or more of the following: on-site sky imaging, satellite imaging, and meteorological modeling.

In certain embodiments, the RES comprises at least one wind turbine, the ESS comprises a battery array, and the time-dependent forecast of electrical energy production comprises a wind production forecast.

In certain embodiments, the method further comprises generating the SOC target-based POGI cap using a computer-implemented, iterative root-finding algorithm.

In certain embodiments, the method further comprises generating the SOC target-based POGI cap using a computer-implemented, matrix-based root-finding algorithm.

In another aspect, the disclosure relates to a method for implementing a power delivery transaction between a buyer and seller for potential electrical energy output of an integrated renewable energy source and energy storage system (RES-ESS) facility that includes a renewable energy source (RES) and an energy storage system (ESS). The method comprises: periodically estimating total potential electrical energy output of the RES during at least one retrospective time window utilizing a signal indicative of one or more sensed parameters; comparing the estimated total potential electrical energy output of the RES to a point of grid interconnect (POGI) limit for the RES-ESS facility to identify potential RES overgeneration during the at least one retrospective time window, wherein potential RES overgeneration equals potential RES electrical energy output in excess of the POGI limit during the at least one retrospective time window; identifying an amount of charged potential RES overgeneration, calculated as potential RES overgeneration charged to the ESS during the at least one retrospective time window; and charging the buyer for undelivered electrical energy if charged potential RES overgeneration is less than potential RES overgeneration during one or more time windows of the at least one retrospective time window.

In certain embodiments, the method further comprises identifying an amount of uncharged potential RES overgeneration, calculated as potential RES overgeneration not charged to the ESS during the at least one retrospective time window; wherein an amount charged to the for undelivered electrical energy is based on a deemed delivered RES overgeneration value that is identified according to the following logical sequence: (i) if potential RES overgeneration equals zero, then the deemed delivered RES overgeneration value equals zero, else (ii) if charged potential RES overgeneration is greater than or equal to potential RES overgeneration, then the deemed delivered RES overgeneration value equals zero, else (iii) if charged RES overgeneration is less than potential RES overgeneration, then the deemed delivered RES overgeneration value equals the lesser of the following items (a) and (b): (a) uncharged potential RES overgeneration, and (b) potential RES overgeneration minus charged RES overgeneration.

In certain embodiments, the at least one retrospective time window comprises a plurality of time periods. In certain embodiments each time period of the plurality of time periods is less than one hour (e.g., each time period may be five minutes, one minute, or another suitable interval).

In certain embodiments, the one or more time windows comprises a summation of multiple time windows of the at least one retrospective time window. In certain embodiments, the summation of multiple time windows corresponds to a period of one day.

In certain embodiments, the method further comprises capping the amount of charged potential RES overgeneration based on a capacity of the ESS, if the potential RES overgeneration exceeds a capacity of the ESS.

In certain embodiments, the RES comprises a photovoltaic array, and the one or more sensed parameters comprise irradiance sensed at one or more locations at the RES-ESS facility.

In certain embodiments, the RES comprises one or more wind turbines, and the one or more sensed parameters comprise wind speed sensed at one or more locations at or above the RES-ESS facility.

In certain embodiments, the RES-ESS facility is configured to supply energy to an electrical grid at a voltage of at least 33 kV or at least 66 kV. In certain embodiments, the ESS is configured to be changed exclusively from the RES.

In another aspect, any of the foregoing aspects, and/or various separate aspects and features as described herein, may be combined for additional advantage. Any of the various features and elements as disclosed herein may be combined with one or more other disclosed features and elements unless indicated to the contrary herein.

Other aspects, features and embodiments of the present disclosure will be more fully apparent from the ensuing disclosure and appended claims.

BRIEF DESCRIPTION OF DRAWINGS

The accompanying drawings incorporated in and forming a part of this specification illustrate several aspects of the disclosure, and together with the description serve to explain the principles of the disclosure.

DETAILED DESCRIPTION

Figure 1:
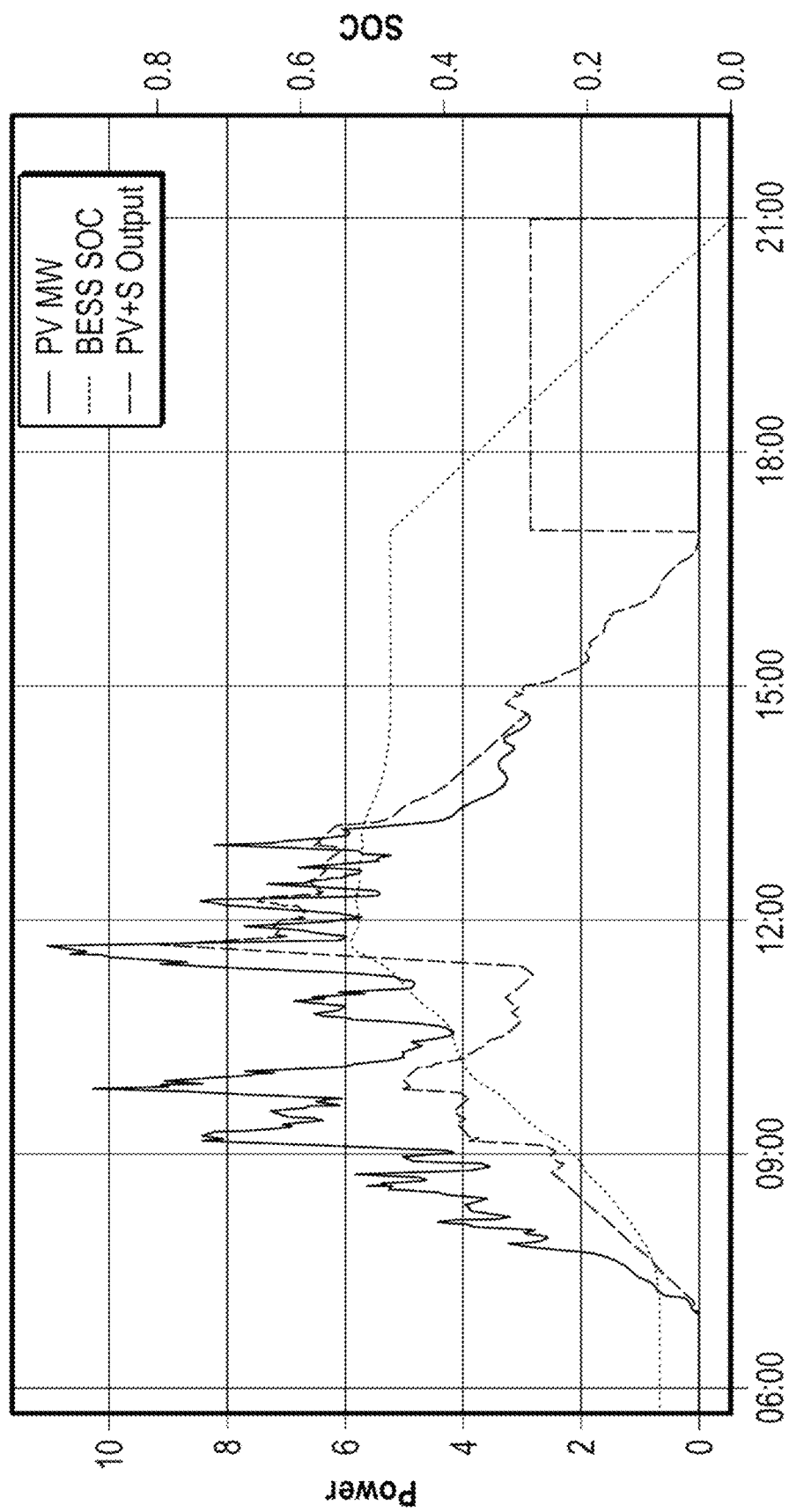
FIG. 1 is an output plot for a conventional RES-ESS facility (including a photovoltaic array and battery storage), showing superimposed plots of RES production, combined RES-ESS output, and ESS state of charge.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein, but it should be understood that such concepts and applications are intended to fall within the scope of the disclosure and the accompanying claims.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments described in the present application document include or utility an integrated renewable energy source ("RES") (e.g., PV, wind, etc.) and energy storage system ("ESS") facility or plant, wherein the combination may be referred to here as RES-ESS or a RES-ESS facility (of which a photovoltaic plus storage or "PV+S" facility is a subset). A RES-ESS facility can reach a desired SOC by charging the ESS with power produced by the RES. In certain embodiments, a RES-ESS facility will reach the desired SOC by prioritizing charging at times when RES generation is high. For example, an ESS may be charged more when more RES generation is available, and an ESS may be charged less (or not at all) when RES generation is limited. The ESS may be discharged when RES generation is limited or unavailable.

In certain embodiments, a RES-ESS facility will charge the ESS exclusively from the RES, so that a maximum investment tax credit (ITC) can be utilized to reduce the effective cost of the facility. In certain embodiments, the ESS may additionally be charged from an electric grid connected to the RES-ESS facility.

Figure 2:
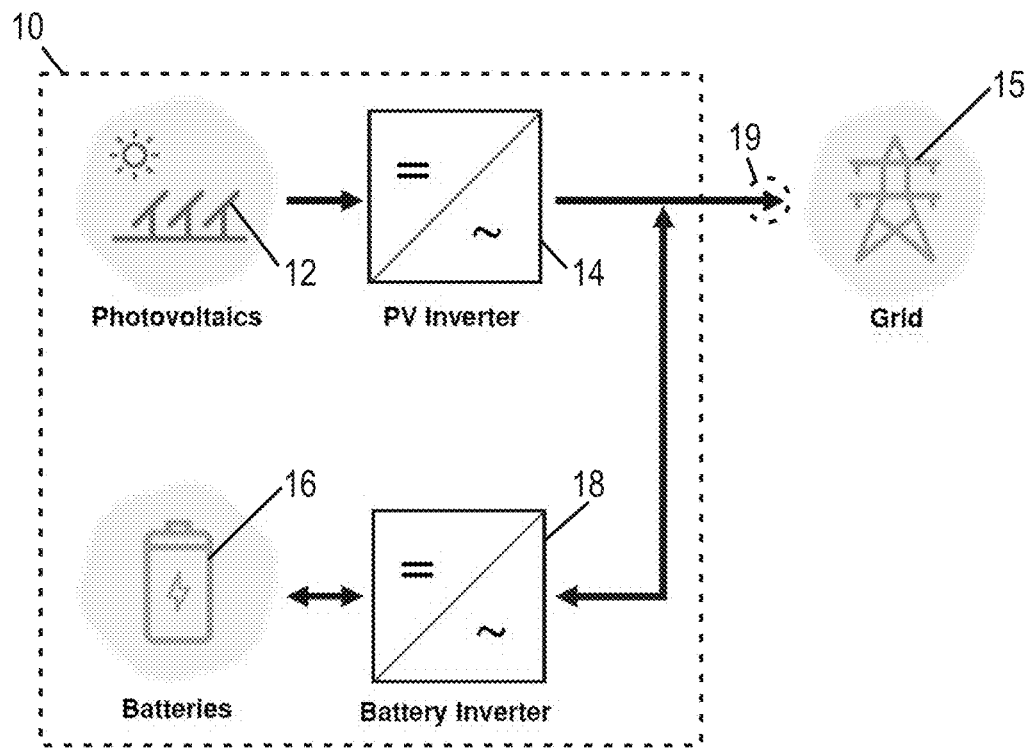
FIG. 2 is a schematic diagram of an AC-coupled RES-ESS facility coupled to an AC electric grid, showing a first power inverter associated with a RES and a second power inverter associated with an ESS.

To provide context for a subsequent discussion of coupling between a RES-ESS facility and an AC electric grid, reference is made to FIGS. 1 and 2.

FIG. 2 is a schematic diagram of an AC-coupled RES-ESS facility 10 coupled to an AC electric grid 15, showing a first power inverter 14 (e.g., a DC/AC inverter) associated with a RES 12 (e.g., a photovoltaic array) and a second power inverter 18 (e.g., a DC/AC inverter) associated with an ESS 16 (e.g., one or more batteries). The first power inverter 14 is coupled between the RES 12 and a grid interconnection point 19. The second power inverter 18 is coupled (i) between the ESS 26 and the grid interconnection point 19, and (ii) between the first power inverter 14 and the grid interconnection point 19. The RES 12 is configured to produce DC electric power, and the first power inverter 14 converts the RES DC electric power to RES AC electric power. The second power inverter 18 is configured to (a) convert RES AC electric power to ESS DC electric power when charging the ESS 16 with RES AC electric power, and (b) convert ESS DC electric power to ESS AC electric power when discharging the ESS AC electric power to the electric grid 15. In this regard, the second power inverter 18 provides bidirectional power conversion utility. The ESS 16 (e.g., batteries) and second power inverter 18 may be located in a single area (e.g., a single centralized enclosure) to provide lower costs of installation and maintenance. Although the first and second power inverters 14, 18 have been described in a singular sense, it is to be appreciated that the first power inverter 14 and the second power inverter 18 each represents at least one power inverter that may encompass any suitable number of individual power inverters.

Figure 3:
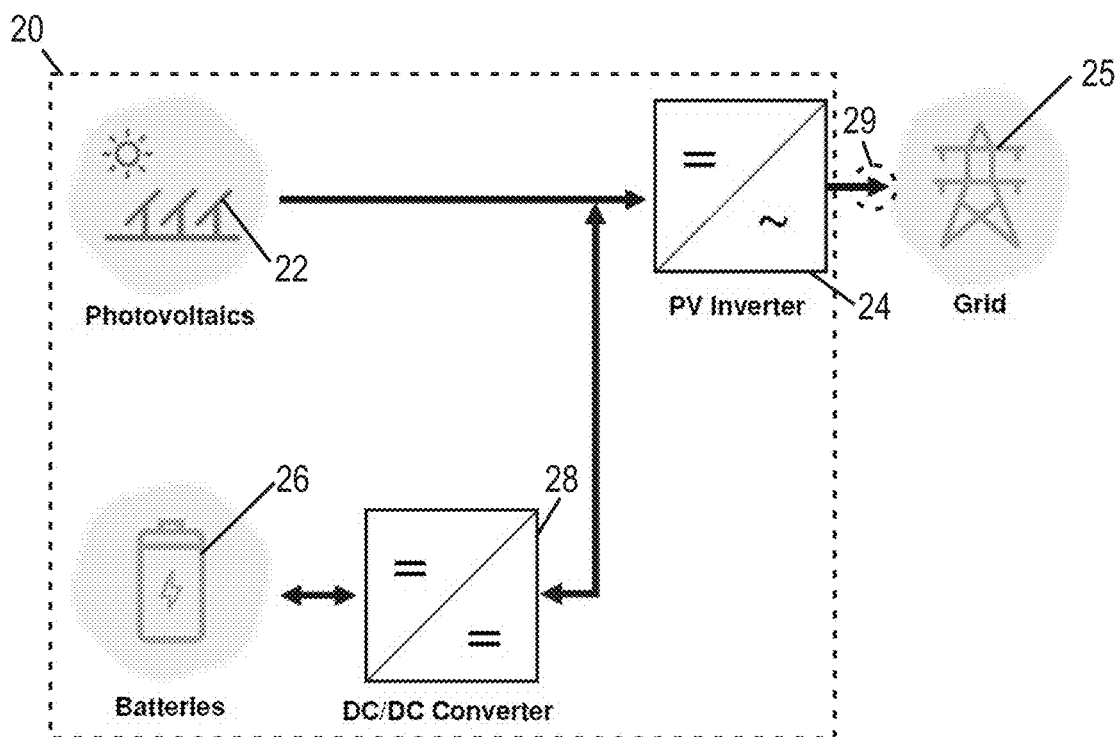
FIG. 3 is a schematic diagram of a DC-coupled RES-ESS facility coupled to an AC electric grid, showing a DC/DC converter associated with an ESS and a power inverter that provides power conversion utility for both the RES and ESS.

FIG. 3 is a schematic diagram of a DC-coupled RES-ESS facility 20 coupled to an AC electric grid 25, showing a DC/DC converter 28 associated with an ESS 26 and a power inverter 29 that provides power conversion utility for both the RES 22 and the ESS 26. The power inverter 29 functions to convert DC electric power received from the RES 22 and/or the ESS 26 to AC electric power to feed AC electric power through a grid interconnection point 29 to the AC electric grid 25.

Although a DC-coupled RES-ESS facility 20 according to FIG. 3 may exhibit lower conversion losses (due to reduced need for power conversion), components (e.g., batteries) of the ESS 26 may need to be spread around a RES-ESS facility 20 proximate to components of the RES 22 to avoid low voltage power dissipation. This necessitates an increased number of containers or enclosures for components of the ESS 26, thereby increasing costs for installation and maintenance. The capital cost for a DC-coupled RES-ESS facility 20 according to FIG. 3 is expected to be higher than an AC-coupled RES-ESS facility 10 according to FIG. 2.

One aspect of the present disclosure is directed to an "AC overbuilt" RES-ESS facility, with ESS capacity and RES inverter capacity being larger than conventional facilities, and with RES inverter capacity being larger than a point of grid interconnect (POGI) limit for the facility. Before discussing an AC overbuilt RES-ESS system in greater detail, however, components of a RES-ESS facility and an accompanying utility interface will be introduced first, with reference to FIGS. 4A, 4B, and 5.

Figure 4A:
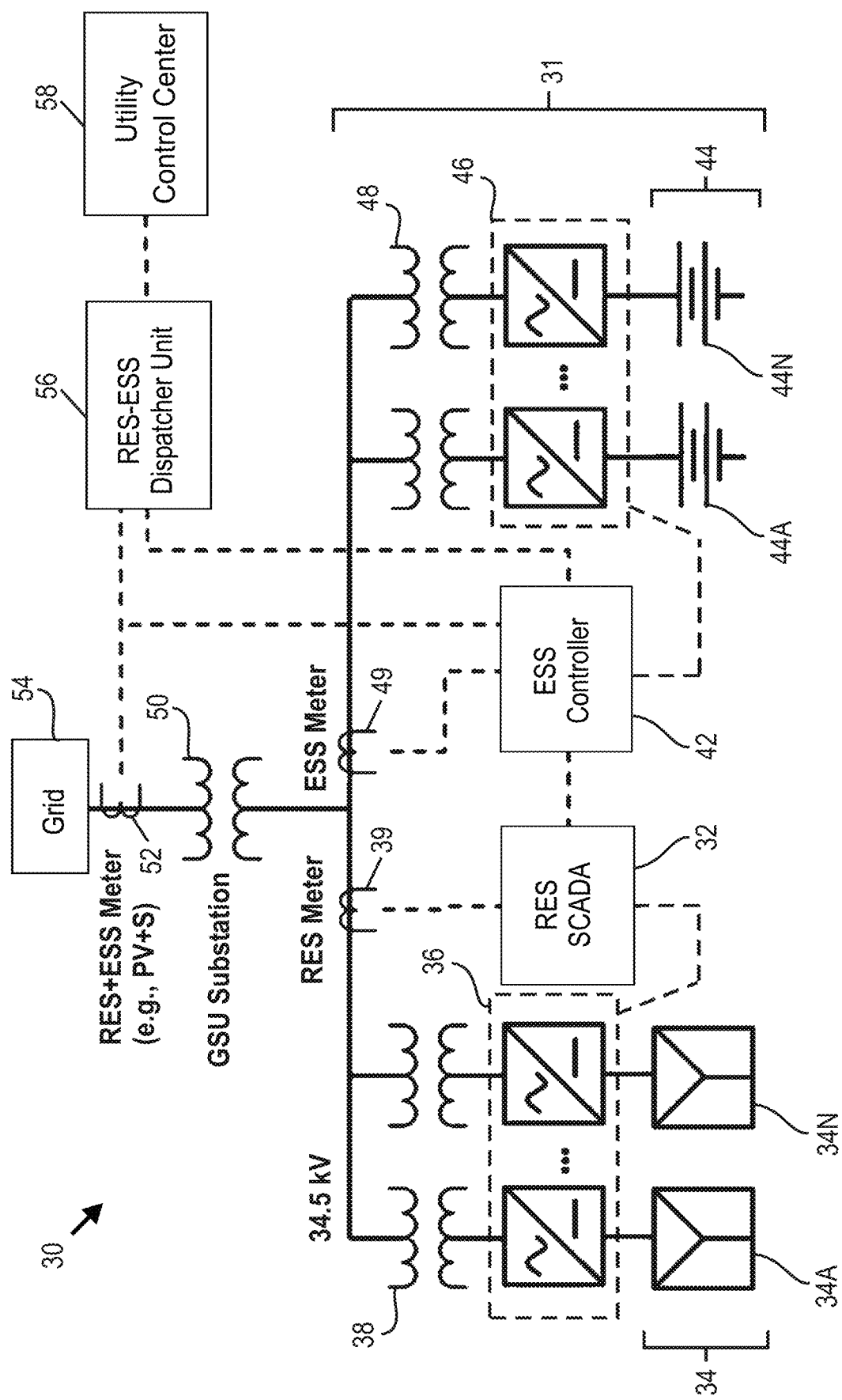
FIG. 4A is a schematic diagram showing interconnections between various components of an AC coupled metering and control system for controlling a renewable energy source and energy storage system (e.g., a photovoltaic (PV) array and a battery array chargeable with electric power produced by the PV array) according to one embodiment of the present disclosure.

FIG. 4A is a schematic diagram showing interconnections between various components of an AC coupled metering and control system 30 for controlling a renewable electrical energy generation device 34 including multiple generation units 34A-34N (such as a photovoltaic (PV) array including photovoltaic units) and an energy storage device 44 including multiple energy storage units 44A-44N (such as a battery array including battery units) chargeable with electric power produced by the renewable electrical energy generation device 34 in a RES-ESS facility 31 according to one embodiment. The RES-ESS facility 31 may combine a renewable electrical energy generation device 34 (e.g., such as an array of PV panels, wind turbines, or the like), and an energy storage device 44 (e.g., an array of lithium-based batteries) that may be coupled to a single substation 50 and/or located in a single property, area, or structure.

FIG. 4A illustrates an AC-coupled RES-ESS facility 31 that uses power inverters 36, 46 (e.g., rectifier-based or other appropriate power converters) to convert DC power produced by a renewable electrical energy generation device 34 (e.g., a PV array in certain embodiments) or power released by the energy storage device 44 to AC power for coupling to an AC electrical grid 54), but in certain embodiments, the RES-ESS facility 31 may embody a DC coupled RES-ESS facility.

In certain embodiments, an energy storage device 44 may include at least one of (or a combination of) batteries 44A, 44B using various constructions and chemistries, capacitors, or mechanical energy storage devices such as flywheels or pumped-hydro installations. In certain embodiments, an energy storage device 44 may include at least one hydrolysis unit (e.g., configured to electrolyze water to release hydrogen), optionally combined with hydrogen consuming electricity producing element (e.g., a fuel cell array or gas turbine) and/or a hydrogen storage unit (e.g., adsorbent media for releasably binding hydrogen, storage vessels, and/or reversible chemical reactant vessels or beds).

In certain embodiments, a fast-following load may be substituted for an ESS to effectuate smoothing of output of a RES facility at a POGI limit. A fast-following load may dissipate energy quickly (e.g., for industrial use) without necessarily promoting energy storage. One non-limiting example of a fast-following load would be a rock crusher.

Control methods involving a RES-ESS facility as disclosed herein may utilize accurate renewable energy production forecasts (e.g., for PV production or wind production) into implementations for controlling components of a RES-ESS facility, as well as state of charge (SOC) schedules for an ESS of such a facility.

In certain embodiments, a RES-ESS dispatcher unit 56 has the ability to control the charge or discharge of the energy storage device 44 (e.g., batteries) by communicating with an ESS controller 42, which may be located in the RES-ESS facility 31. A RES SCADA (supervisory control and data acquisition) controller 32 is operatively coupled with RES inverters 36 associated with the renewable electrical energy generation device 34 (optionally embodied in a PV array), and the ESS controller 42 is operatively coupled with ESS inverters 46 associated with the energy storage device 44, with both the RES SCADA controller 32 and the ESS controller 42 being in communication with the RES-ESS dispatcher unit 56. In certain embodiments, a utility control center 58 (e.g., of an electric power utility or grid operator) may communicate with the RES-ESS dispatcher unit 56 using DNP3 and set different configuration options. Additionally, the RES-ESS dispatcher unit 56 receives (or generates) an accurate renewable generation forecast (e.g., solar generation forecast) that it uses to implement any desired control modes. As shown in FIG. 3A, certain embodiments may utilize readily available electric power meters, such as a RES+ESS electrical power meter 52 to measure RES-ESS (e.g., PV+S) facility output, a RES electrical power meter 39 to measure RES output, and an ESS electrical power meter 49 to measure ESS output. Signals from the RES electrical power meter 39 are provided to the RES SCADA controller 32, and signals from the ESS electrical power meter 49 are provided to the ESS controller 42. The electric power generated by the RES-ESS facility 31 may be provided to an electric power system (e.g., an AC electrical grid 54) via a generator step-up (GSU) substation 50 that implements protection and appropriate voltage conversion. RES transformers 38 and ESS transformers 48 may be arranged between the inverters 36, 46, respectively, and the GSU substation 50 to provide voltage conversion utility (e.g., to supply AC power signals to the GSU substation 50 at 34.5 kV in certain implementations).

Figure 4B:
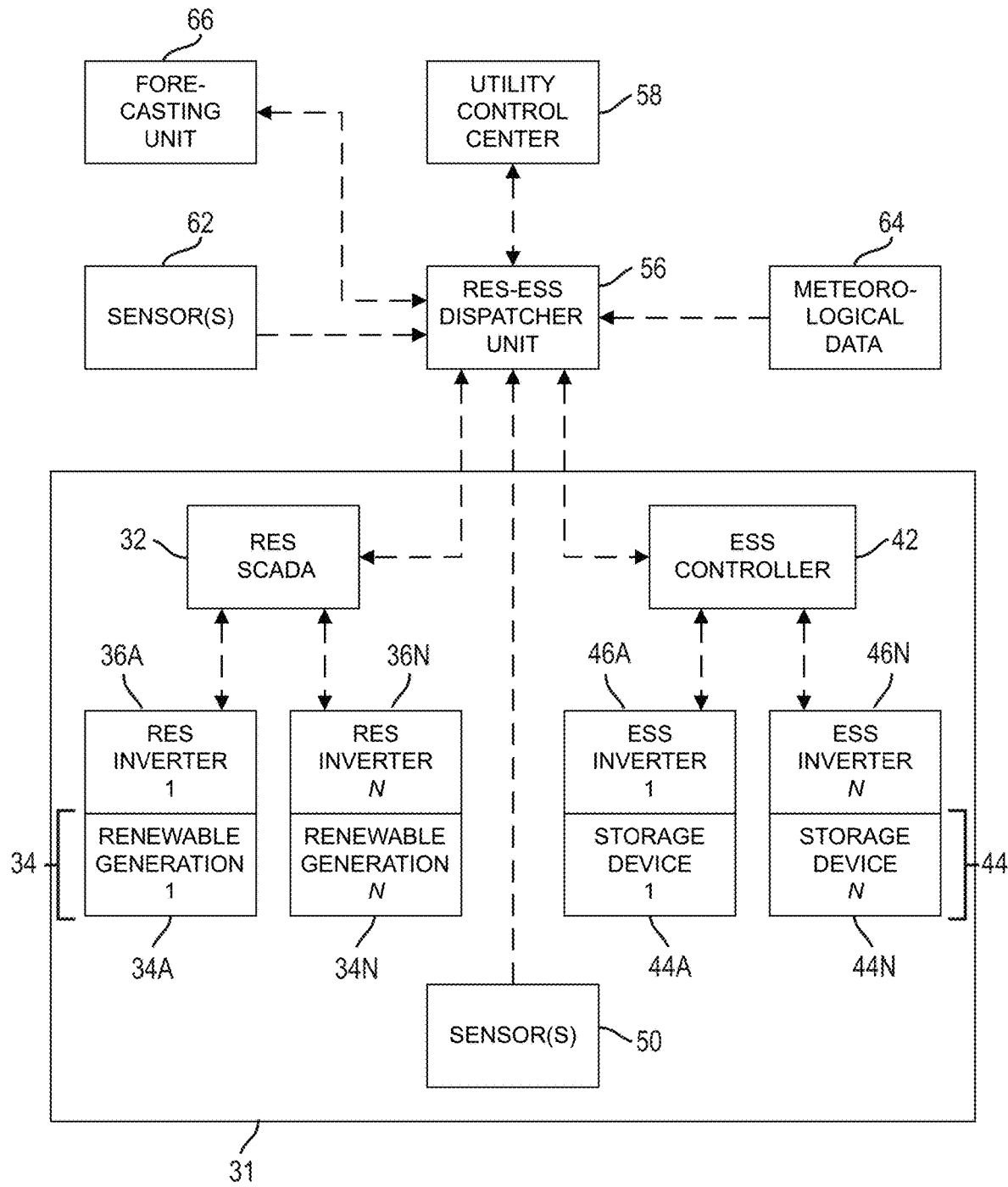
FIG. 4B is a schematic diagram showing certain components of the AC coupled metering and control system of FIG. 4A.

FIG. 4B is a schematic diagram showing certain components of the AC coupled metering and control system of FIG. 4A, including interconnection of control- and sensor-related components. As shown in FIG. 4B, the RES-ESS dispatcher unit 56 is arranged between a utility control center 58 and a RES-ESS facility 31. Within the RES-ESS facility 31, a RES SCADA controller 32 is operatively coupled with RES inverters 36A-36N (wherein N represents any suitable number) that are configured to provide AC conversion of DC power produced by renewable electrical energy generation units 34A-34N (e.g., arrangeable as parts of a renewable electrical energy generation device 34). Similarly, within the RES-ESS facility 31, an ESS controller 42 is operatively coupled with ESS inverters 46A-46N that are configured to provide AC conversion of DC power supplied by energy storage units 44A-44N (e.g., arrangeable as parts of an energy storage device 44). The RES-ESS facility 31 further includes at least one sensor 50, which may comprise one or more sky imaging sensors useful to determine sky conditions (such as presence of clouds) proximate to the RES-ESS facility 31, with output signals from the at least one sensor 50 being supplied to the RES-ESS dispatcher unit 56. The RES-ESS dispatcher unit 56 may also receive: (i) signals from one or more sensors 62 (e.g., satellite imaging sensors or the like) not necessarily associated with the RES-ESS facility 31; (ii) meteorological data provided by a meteorological modeling unit 64; (iii) signals from a forecasting unit 66 that may forecast generation by the renewable electrical energy generation device 34 and/or one or more other renewable electrical energy generation devices or units. In certain embodiments, time-dependent forecasting of electrical energy production may be performed by the forecasting unit 66 or may be performed by the RES-ESS dispatcher unit 56. In certain embodiments, a time-dependent forecast of electrical energy production may utilize one, two, or all three (e.g., as an ensemble of two or more) of the following: on-site sky imaging provided by the sensor(s) 50, satellite imaging provided by the sensor(s) 62, and meteorological data provided by the meteorological modeling unit 64. In certain embodiments, sensors of other types may be used.

Figure 5:
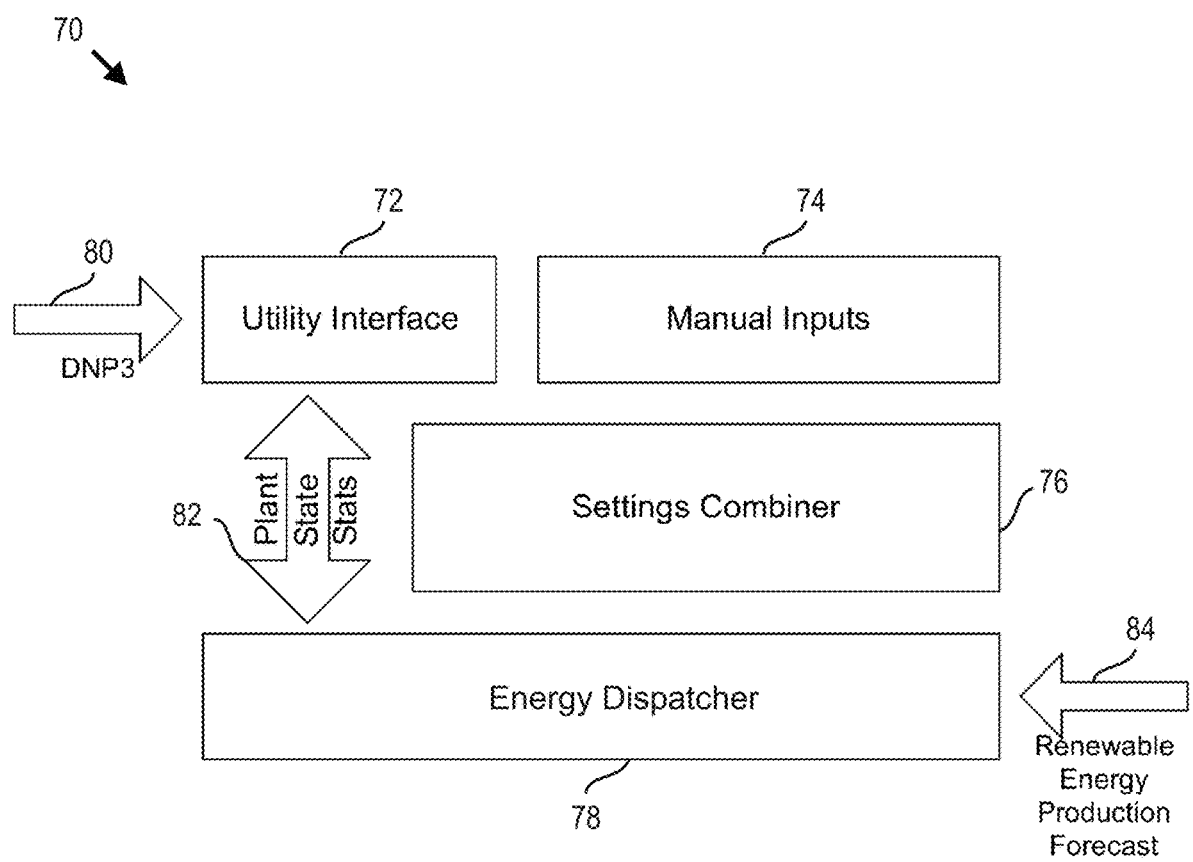
FIG. 5 is a block diagram for a processor-based energy dispatch control system for dispatching a renewable electrical energy generation resource and an electrical energy storage device chargeable with electric power produced by the renewable electrical energy generation resource according to one embodiment of the present disclosure.

FIG. 5 is a block diagram showing for a processor-based energy dispatch control system 70 for dispatching a RES-ESS facility (e.g., including renewable electrical energy generation resource and an electrical energy storage device chargeable with electric power produced by the renewable electrical energy generation resource) according to one embodiment. The control system 80 includes as functional blocks a utility interface 72, manual inputs 74, a settings combiner 76, and an energy dispatcher 78. The utility interface 72 communicates with an electric power system utility, and with the energy dispatcher 78 to receive configuration commands (e.g., mode configuration commands) and send plant status and state information 82. An example of a coordinated charge-discharge mode configuration set by a utility may be a schedule that contains a first SOC target at a pre-determined time, and a second SOC target at a second pre-determined time. For example, the utility may want the ESS to reach an SOC of 90% by 5:00 PM and an SOC of 10% by 10:00 PM. The utility interface 72 receives DNP3 (Distributed Network Protocol) information via a DNP3 link 70, and is responsible for converting the published DNP3 configuration points to internal data structures. The utility interface 72 is also responsible for communicating any data structure changes back to the utility via the DNP3 link 80. Manual inputs 74 include configuration parameters that are not addressable by MESA-ESS SCADA points. The settings combiner 76 validates any configuration inputs and passes them to the energy dispatcher 78 in one implementation. The settings combiner 76 receives MESA-ESS schedules/modes/curves provided by a utility or grid operator, receives schedules produced by an optimizer, and receives any potential manual inputs 74, and then produces combined schedules/modes/curves. The energy dispatcher 78 is an engine that executes control modes for the RES-ESS facility (or plant) and decides on the charge or discharge level of the ESS utilizing a renewable energy production forecast 84. The energy dispatcher 78 is responsible for controlling output of a RES-ESS facility in short time scales by observing the current state of the RES-ESS facility, utilizing time-dependent forecasts of electrical energy production by the RES, and utilizing any combined MESA-ESS schedules/modes/curves produced by the settings combiner 76. A renewable energy forecast may contain a time series of points for the power expected to be generated by the renewable energy source (e.g., PV array, wind turbine, etc.). Such a forecast may have a format of (timestamp, power value) and contain a set of time values of specified intervals (e.g., 15 minutes in 1 minute intervals, 36 hours in 1 hour intervals, etc.). These potential formats and timeframes are provided to illustrate the nature of an exemplary forecast, and are not intended to limit the disclosure. The energy dispatcher 78 is also responsible for passing alerts and RES-ESS plant state and/or status information back to the utility interface 72.

Having described components of a RES-ESS facility, an AC overbuilt facility will now be described.

A. AC Overbuilt RES-ESS Facility

One aspect of the present disclosure is directed to an "AC overbuilt" RES-ESS facility, embodying an AC-coupled RES-ESS facility with ESS capacity and RES inverter capacity being larger than conventional facilities, and with RES inverter capacity being larger than a point of grid interconnect (POGI) limit for the facility. This permits a RES to be significantly oversized relative to a POGI limit without requiring generation in excess of the POGI limit to be curtailed, since the excess generation may be captured by the ESS. An AC overbuilt RES-ESS facility may be configured to supply power to an AC electric grid at the POGI limit, while simultaneously supplying power to an ESS. In such a facility, a large-capacity ESS (or a fast-following load) is used as a load to absorb RES generation in excess of the POGI limit, to ensure that power is supplied from the RES-ESS facility at a level not exceeding the POGI limit for the facility.

An AC overbuilt RES-ESS facility is suitable for providing a high level of fixed firm capacity for a long duration, in contrast to a conventional RES-ESS facility that typically provides peaking utility. A conventional AC-coupled RES-ESS facility includes an aggregate RES inverter output capacity that is matched to a POGI limit. A slight degree (e.g., 2%-3%) of excess RES inverter capacity may theoretically be provided in a conventional RES-ESS in order to accommodate reactive power demand and losses, but any higher levels of excess RES inverter capacity have not been adopted to avoid violating FERC interconnection procedures and the LGIA as described previously herein in the Background.

In certain embodiments, a RES-ESS facility comprises a RES that produces RES DC electric power; an ESS configured to be charged with electric power produced by the RES; at least one first power inverter coupled between the RES and a grid interconnection point, and at least one second power inverter coupled (i) between the ESS and the grid interconnection point, and (ii) between the at least one first power inverter and the grid interconnection point. The at least one first power inverter is configured to convert RES DC electric power to RES AC electric power. The at least one second power inverter is configured to (a) convert RES AC electric power to ESS DC electric power when charging the ESS with RES AC electric power, and (b) convert ESS DC electric power to ESS AC electric power when discharging the ESS AC electric power to the electric grid. An aggregate output capacity of the at least one first power inverter is sized to exceed the POGI limit; and the RES-ESS facility is configured to divert RES AC electric power to the at least one second power inverter in an amount sufficient to avoid supplying RES AC electric power to the electric grid in excess of the POGI limit.

In certain embodiments of an AC oversized RES-ESS facility, the aggregate output capacity of the at least one first power inverter is sized to exceed the POGI limit by at least 10%, by at least 30%, by at least 50%, by at least 70%, by at least 100%, or another threshold specified herein. In certain embodiments, the foregoing minimum thresholds may optionally be capped (where appropriate) by values of (A) 120%, (B) 150%, (C) 200%, or the sum of (i) the POGI limit and (ii) a capacity of the ESS. In certain embodiments, the aggregate output capacity of the at least one first power inverter is sized to equal a sum of (i) the POGI limit and (ii) a capacity of the ESS. In certain embodiments, the at least one first power inverter may comprise multiple power inverters.

Technical benefits of an AC overbuilt RES-ESS facility include the ability to provide a higher capacity factor (e.g., 50-60% for an AC overbuilt PV-BESS facility, as compared to a range of perhaps 30-40% for a conventional PV-BESS facility). Such a facility is capable of delivering more renewable energy with existing transmission resources (which is expensive and time-consuming to build). A lower cost of energy may be attained because fixed development project costs may be amortized over more annual megawatt-hours of production.

As noted above, an AC overbuilt RES-ESS facility is also suitable for providing a high level of fixed firm capacity (e.g., at least 70%, at least 80%, at least 90%, at least 95%, or at least 99% of a POGI limit) for a long duration (e.g., at least 6 hours per day, at least 8 hours per day, at least 12 hours per day, at least 16 hours per day, at least 20 hours per day, or 24 hours per day in certain embodiments). In certain embodiments, long-term weather data may be utilized when sizing an ESS and the at least one first inverter to permit the foregoing capacity and duration thresholds to be achieved with a confidence window of at least 90%, at least 95%, at least 98%, or at least 99% over all foreseeable weather conditions. In certain embodiments, the confidence window corresponds to a number of days per month or per year in which the specified fixed firm capacity and long duration is attained. The ability to provide a high level of fixed firm capacity enables an AC overbuilt RES-ESS facility to replace conventional baseload assets (e.g., gas-fired, coal-fired, or nuclear power plants) and improve grid stability.

In certain embodiments, a method for controlling a RES-ESS facility configured to supply electric power to an electric grid at a grid interconnection point is provided, with the RES-ESS facility including a renewable energy source (RES) and an energy storage system (ESS) chargeable with electric power produced by the RES, and the RES-ESS facility having a point of grid interconnect (POGI) limit. The method comprises: providing at least one first power inverter coupled between the RES and the grid interconnection point, wherein the at least one first power inverter is configured to convert RES DC electric power to RES alternating current (AC) electric power, and an aggregate output capacity of the at least one first power inverter is sized to exceed the POGI limit; providing at least one second power inverter coupled (i) between the ESS and the grid interconnection point, and (ii) between the at least one first power inverter and the grid interconnection point, wherein the at least one second power inverter is configured to (a) convert RES AC electric power to ESS DC electric power when charging the ESS with RES AC electric power, and (b) convert ESS DC electric power to ESS AC electric power when discharging the ESS AC electric power to the electric grid; and while supplying a first portion of the RES AC electric power to the electric grid, diverting a second portion of the RES AC electric power to the at least one second power inverter in an amount sufficient to avoid supplying RES AC electric power to the electric grid in excess of the POGI limit.

In certain embodiments, the method further comprises supplying RES AC electric power to the electric grid at a fixed firm capacity of at least 80% (or at least 90%, or at least 95%, or 100%) of the POGI limit for a duration of at least 8 hours per day, or at least 12 hours per day, or at least 16 hours per day, or another threshold specified therein. In certain embodiments, the supplying of RES AC electric power to the electric grid for the specified fixed firm capacity and duration is performed for at least 90%, at least 95%, or at least 99% of the days in a specified month or year.

Figure 6A:
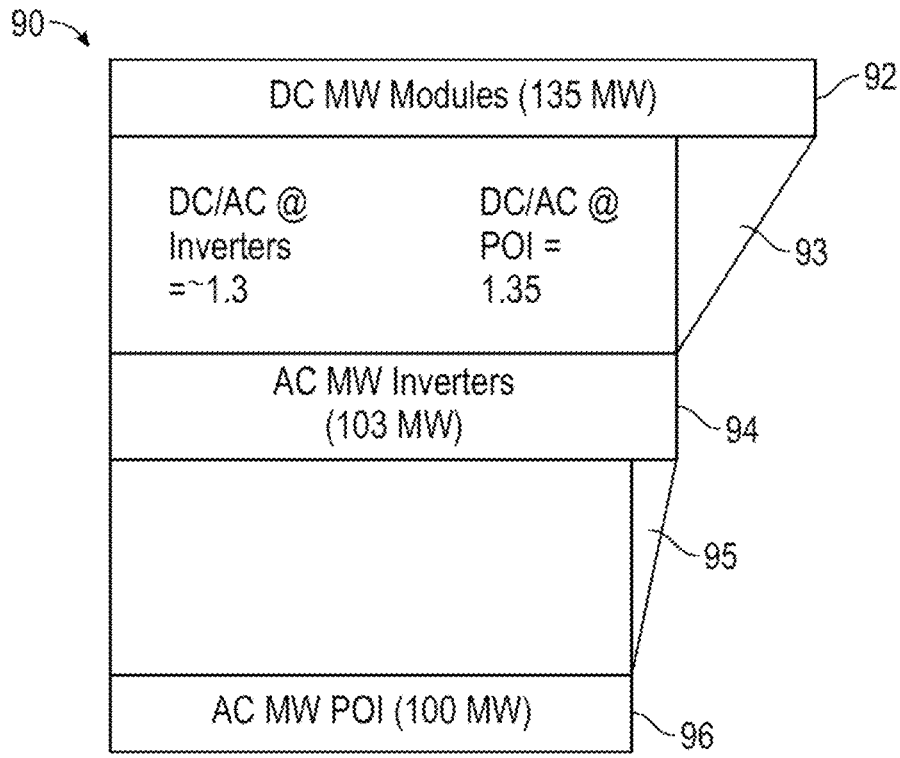
FIG. 6A is a diagram showing relative sizes of a RES, a power inverter, and a point of grid interconnect limit for a conventional RES facility coupled with an AC electric grid.
Figure 6B:
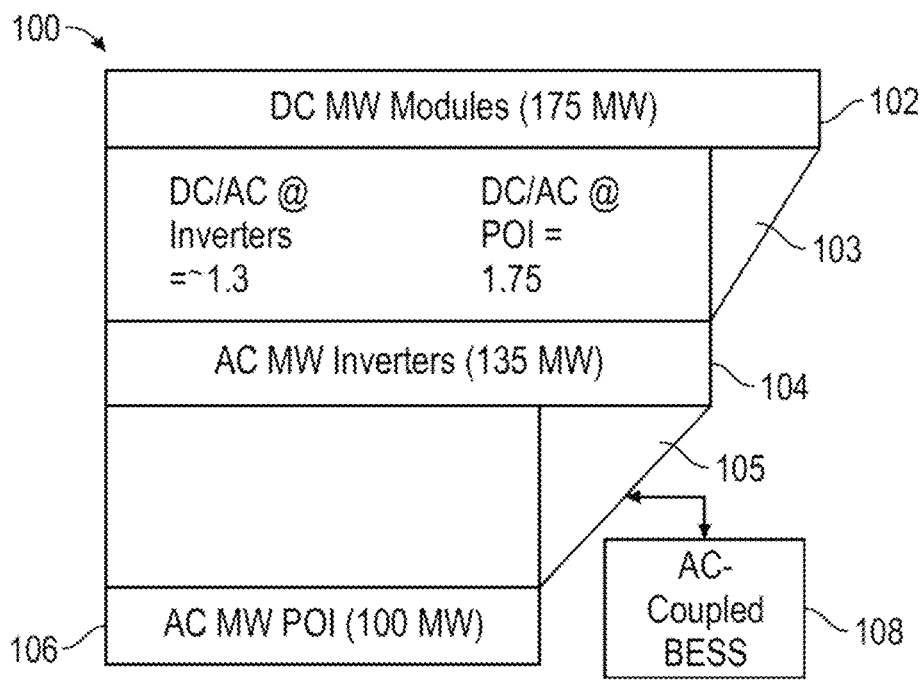
FIG. 6B is a diagram showing relative sizes of a RES, a power inverter, and a point of grid interconnect limit for an AC overbuilt RES-ESS facility according to one embodiment of the present disclosure.
Figure 6C:
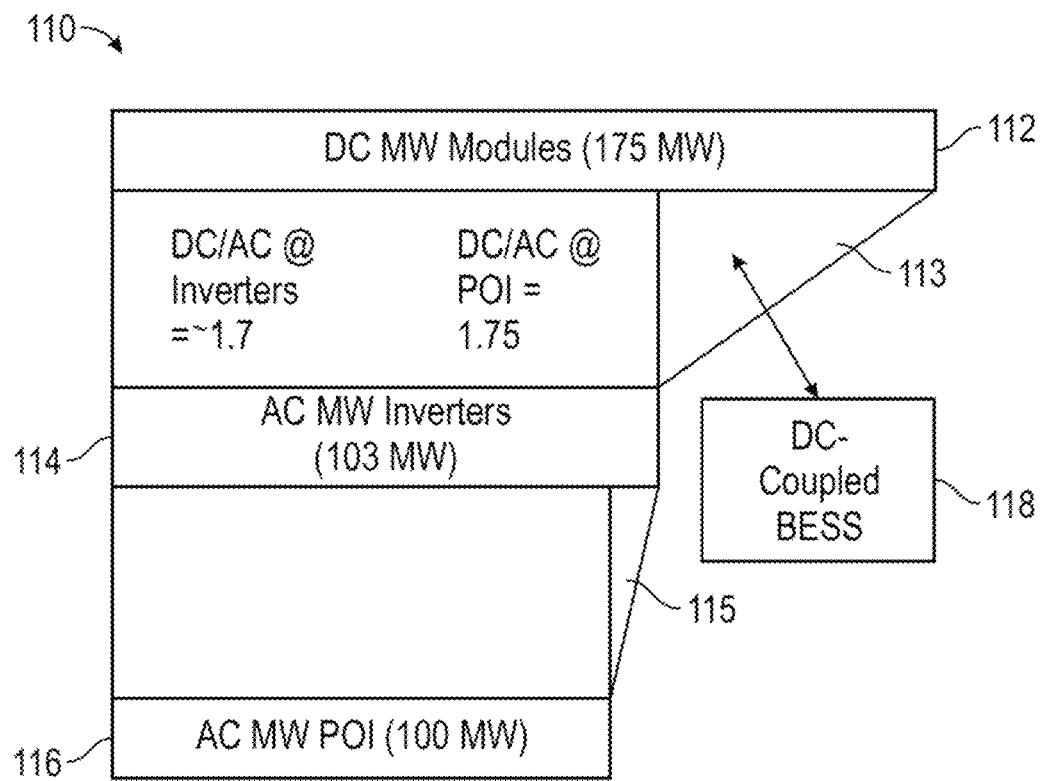
FIG. 6C is a diagram showing relative sizes of a RES, a power inverter, and a point of grid interconnect limit for a DC-coupled RES-ESS facility, to permit comparison to FIG. 6B.

FIGS. 6A-6C provide basis for comparing component sizing and attributes of an AC overbuilt RES-ESS facility (according to FIG. 6B) relative to a conventional AC-coupled RES-ESS facility (according to FIG. 6A) and relative to a DC coupled RES-ESS facility (according to FIG. 6C). Values for RES capacity, inverter capacity, and point of interconnect limits provided in FIGS. 6A-6C are provided to promote ease of understanding, without intending to limit a scope of protection.

FIG. 6A is a diagram showing relative sizes of a RES 92 (e.g., comprising direct current photovoltaic modules), power inverters 94, and a point of interconnect limit (previously referred to herein as POGI limit) for a conventional RES facility 90 coupled with an AC electric grid at a grid interconnection point 96. As shown in FIG. 6A, the RES 92 may be configured to output 135 MW, the power inverters 94 (which serve to convert RES DC electric power to AC electric power) may have an output capacity of no greater than 103 MW, and the POGI limit may be 100 MW. A ratio of RES DC power supplied from the RES 92 to the power inverters 94 may be about 1.3, while a ratio of RES DC power to the POGI limit may be 1.35. A mismatch between RES DC power and a capacity of the power inverters 94 results in a first portion of clipped or lost energy 93, and a mismatch between the capacity of the power inverters 94 and the POGI limit results in a second portion of clipped or lost energy, that is wasted when the RES 92 is generating RES DC power at full capacity.

FIG. 6B is a diagram showing relative sizes of a RES 102 (e.g., comprising direct current photovoltaic modules), power inverters 104, and a point of interconnect limit (previously referred to herein as POGI limit) for an AC overbuilt RES-ESS facility 100 coupled with an AC electric grid at a grid interconnection point 106, according to one embodiment of the present disclosure. As shown in FIG. 6B, the RES 102 may be configured to output 175 MW, the power inverters 104 (which serve to convert RES DC electric power to RES AC electric power) may have an output capacity of 135 MW, and the POGI limit may be 100 MW. An AC-coupled ESS 108 (having an associated power inverter (not shown)) is provided to receive and store any portion of the RES AC electric output that exceeds the POGI limit, thereby avoiding feeding excess energy to the electric grid, while avoiding a potential energy loss 105 if the ESS 108 were not present. A ratio of RES DC power supplied from the RES 102 to the power inverters 104 may be about 1.3, while a ratio of RES DC power to the POGI limit may be 1.75. A mismatch between RES DC power and a capacity of the power inverters 104 results in clipped or lost energy 103 that is wasted when the RES 92 is generating RES DC power at full capacity. In certain embodiments, the capacity of the power inverters 104 may be increased relative to the value stated in FIG. 6B to one of the thresholds stated herein (e.g., to be equal to a sum of the POGI limit and the capacity of the ESS 108). If it is desired to reduce or limit the clipped or lost energy 103, the power inverters 104 may be sized to have a capacity closer or equal to an output capacity of the RES 102.

Although FIG. 6B depicts a modest degree of oversizing of an ESS and power inverters, it is to be appreciated that any suitable degree of oversizing may be provided to enable a RES-ESS to provide a desired fixed firm capacity level and desired duration with a desired degree of confidence.

FIG. 6C is a diagram showing relative sizes of a RES 112, power inverters 114, and a point of grid interconnect limit for a DC-coupled RES-ESS facility 110 coupled with an AC electric grid at a grid interconnection point 116, wherein a DC-coupled ESS 118 is arranged to receive and store RES DC electric output that exceeds the capacity of the power inverters 114 (thereby avoiding a potential energy loss 113 if the ESS 118 were not present). A ratio of RES DC power supplied from the RES 112 to the power inverters 114 may be about 1.7, while a ratio of RES DC power to the POGI limit may be 1.75. A mismatch between an output capacity of the power inverters 114 and the POGI limit results in clipped or lost energy 115 that may be wasted when the RES 112 is generating RES DC power at full capacity and the power inverters 114 are operating at capacity.

Figure 7A:
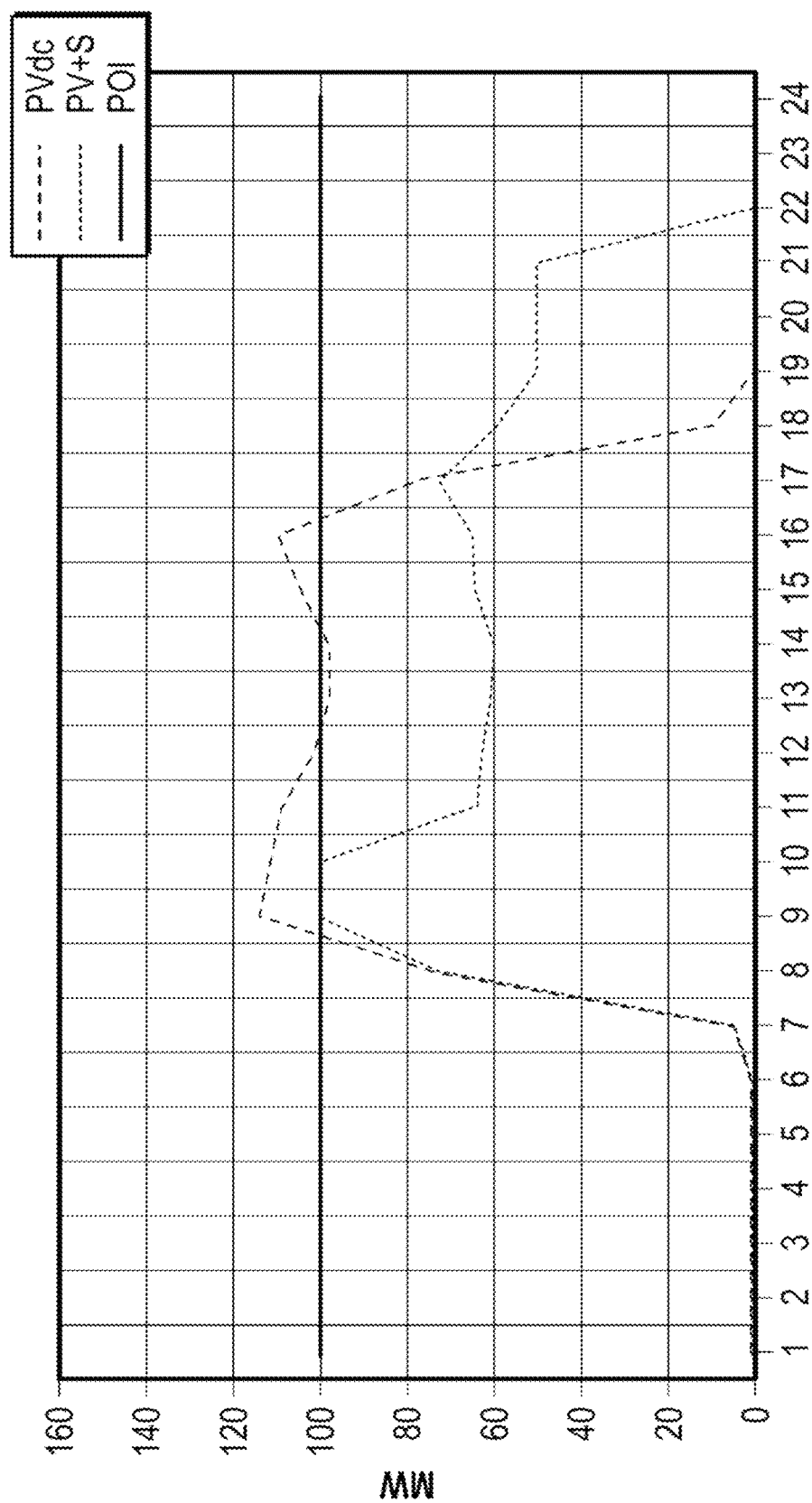
FIG. 7A is a modeled output plot for an AC-coupled RES-ESS facility having power inverter capacity matched to a point of grid interconnect limit, with superimposed plots of RES production and combined RES-ESS output.
Figure 7B:
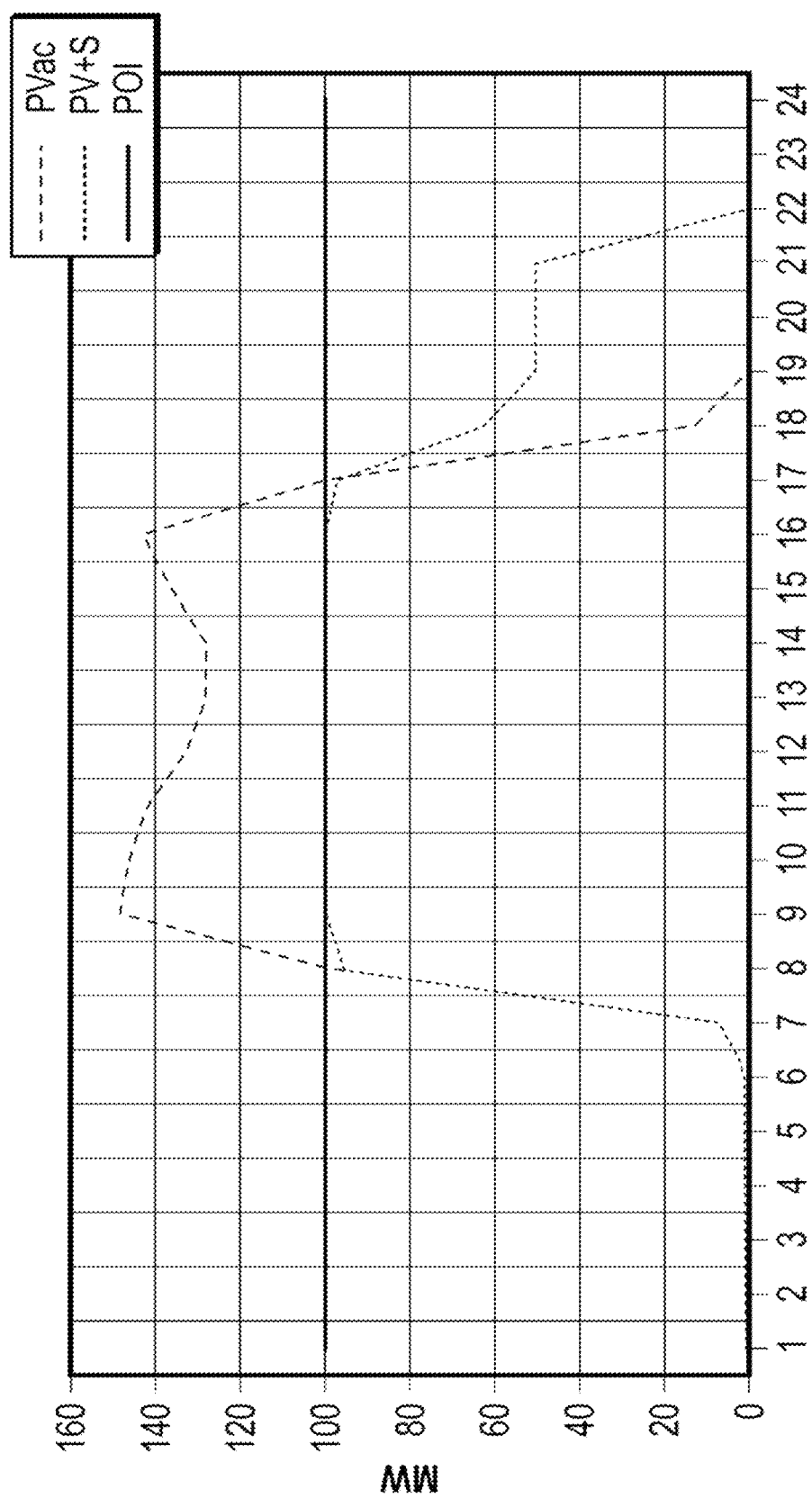
FIG. 7B is a modeled output plot for an AC overbuilt RES-ESS facility having power inverter capacity that exceeds a point of grid interconnect limit according to one embodiment of the present disclosure, with superimposed plots of RES production and combined RES-ESS output.

Differences in operation and performance between a non-overbuilt RES-ESS facility and an AC overbuilt RES-ESS facility may be understood upon comparison of FIGS. 7A and 7B.

FIG. 7A is a modeled output plot for a non-overbuilt AC-coupled RES-ESS facility having power inverter capacity that is matched to a point of grid interconnect limit. FIG. 7A provides superimposed plots of RES production (i.e., photovoltaic or "PV"), combined RES-ESS output (i.e., PV plus storage or "PV+S"), and point of interconnect (POI) limit (which is also referred to herein as POGI limit"). As shown, the POI limit is 100 MW, the peak PV output (i.e., as direct current, before being clipped by the inverter capacity limit close to the POGI power limit) is about 10% higher than the POI limit, and the PV+S output equals the POI limit for only about one hour during the day.

FIG. 7B is a modeled output plot for an AC overbuilt RES-ESS facility having a power inverter capacity that significantly exceeds a point of grid interconnect limit according to one embodiment of the present disclosure. FIG. 7B provides superimposed plots of RES production (i.e., photovoltaic or "PV"), combined RES-ESS output (i.e., PV plus storage or "PV+S"), and point of interconnect (POI) limit (which is also referred to herein as POGI limit"). As shown, the POI limit is 100 MW, the peak PV output (as alternating current, after inversion) is about 50% higher than the POI limit, and the PV+S output equals the POI limit for about eight hours or longer during the day. The area between the plotted POI limit and the PV production represents energy available to be stored in an energy storage device (e.g., battery array). Presence of a high-capacity energy storage device with oversized inverter capacity (exceeding the POI limit) permits excess energy produced by the PV array (i.e., power in excess of the POI limit) to be stored. This permits the PV+S output to function similarly to a baseload unit between about 09:00 and 17:00 by providing a fixed firm capacity during this period, while still permitting excess energy to be stored for discharge later in the day after PV production has ramped down.

Figure 8:
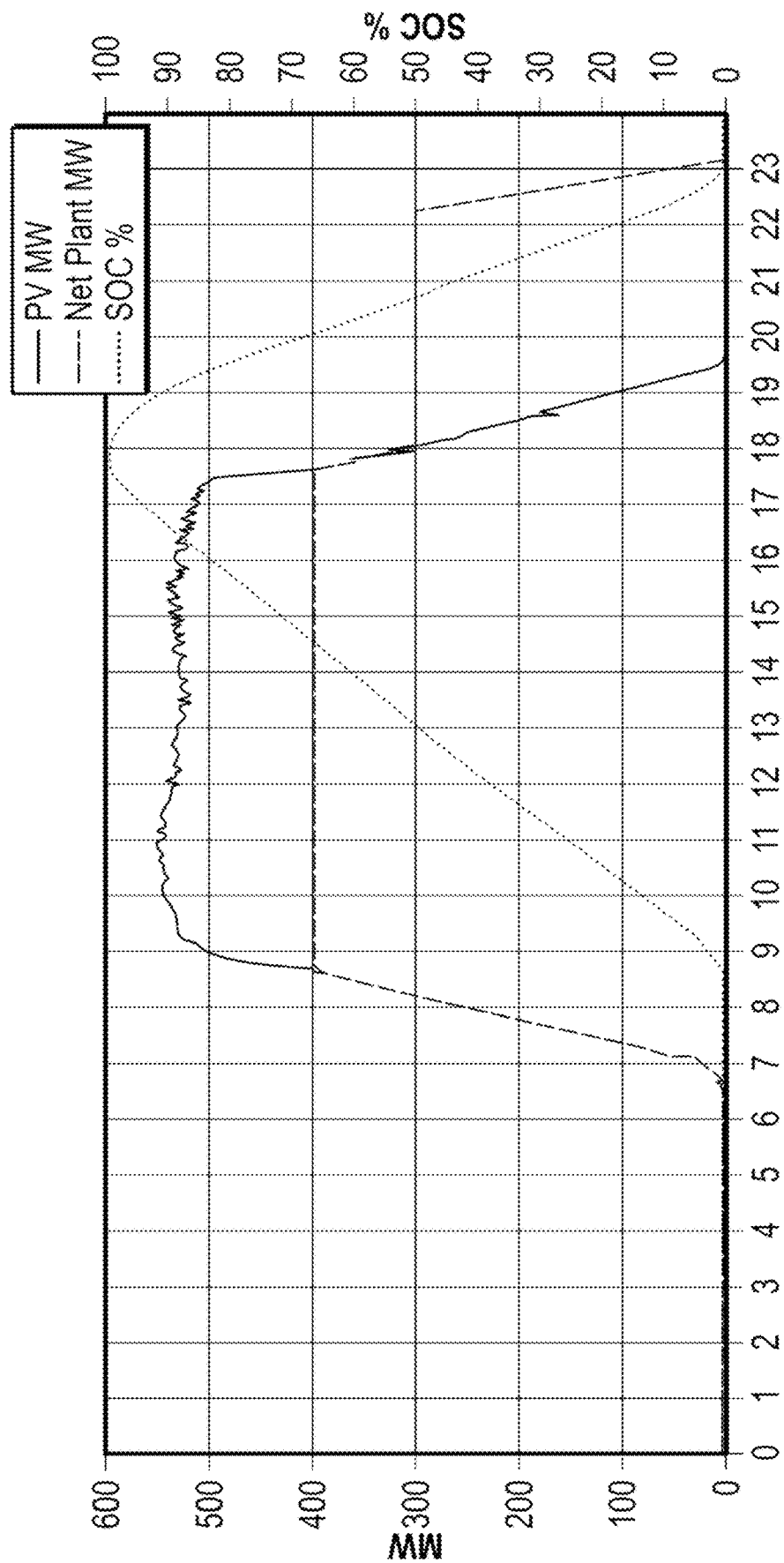
FIG. 8 is a modeled output plot for an AC overbuilt RES-ESS facility having power inverter capacity that exceeds a point of grid interconnect limit according to one embodiment of the present disclosure, with superimposed plots of RES production, combined RES-ESS output, and state of charge of the ESS.

FIG. 8 is a modeled output plot for an AC overbuilt RES-ESS facility having power inverter capacity that exceeds a point of grid interconnect limit according to one embodiment of the present disclosure, with superimposed plots of RES production (photovoltaic megawatts, or "PV MW"), combined RES-ESS output ("net plant MW"), and state of charge ("SOC %") of the ESS. In the modeled configuration, the ESS has a capacity to charge or discharge 300 MW, the ESS has a maximum output capacity of greater than 500 MW (as alternating current, after inversion), and the POGI limit is 400 MW. As shown, the combined RES-ESS AC output supplied to the grid is 400 MW from about 08:30 to about 17:30, with such amount being equal to the POGI limit for the facility. During the same interval, RES production exceeds the POGI limit, with the energy of this overgeneration being used to charge the ESS (as shown by the rising state of charge). When RES production starts to fall around 17:30, control of the ESS is switched from a charging mode to a discharging mode, and output of the ESS is converted to AC to supply power to the grid. ESS AC output of 300 MW is supplied to the grid from about 18:00 to about 22:30 and then drops to zero by 23:00, thereby readying the ESS to be charged the next day to receive generation of the RES that exceeds the POGI limit for the facility. As shown, the facility may be used to supply power to the grid at a fixed value equal to the POGI limit for more than 9 hours, and to further supply power to the grid at a value equal to 75% of the POGI limit for more than 4 additional hours. The ability of the AC overbuilt RES-ESS facility to supply fixed firm capacity at or near the POGI limit for long sustained periods at a high capacity represents a significant departure from conventional RES-ESS facilities.

Figure 9A:
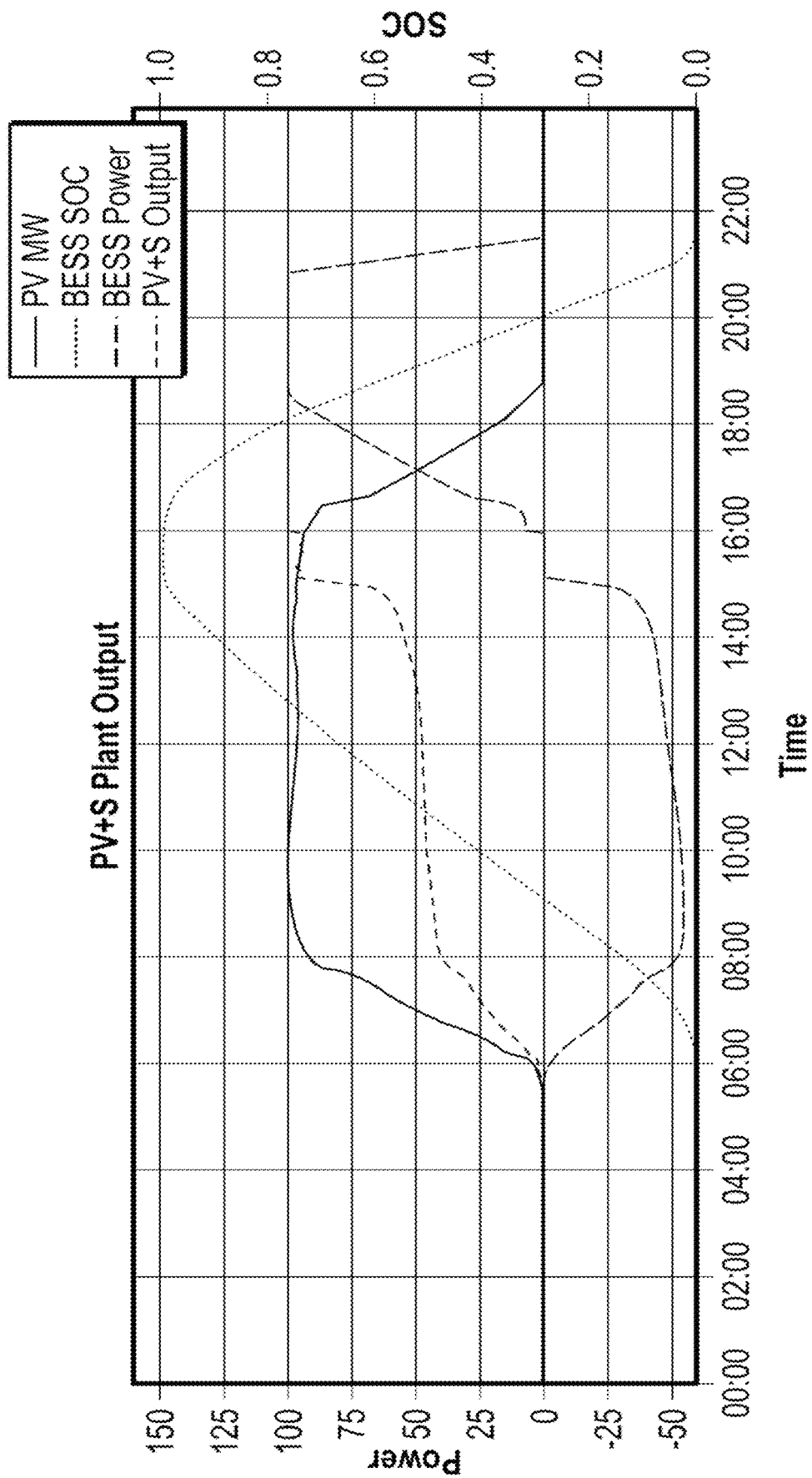
FIG. 9A is a modeled output plot for an AC-coupled RES-ESS facility having power inverter capacity matched to a point of grid interconnect limit, with superimposed plots of RES production, combined RES-ESS output, state of charge of the ESS, and ESS power output.
Figure 9B:
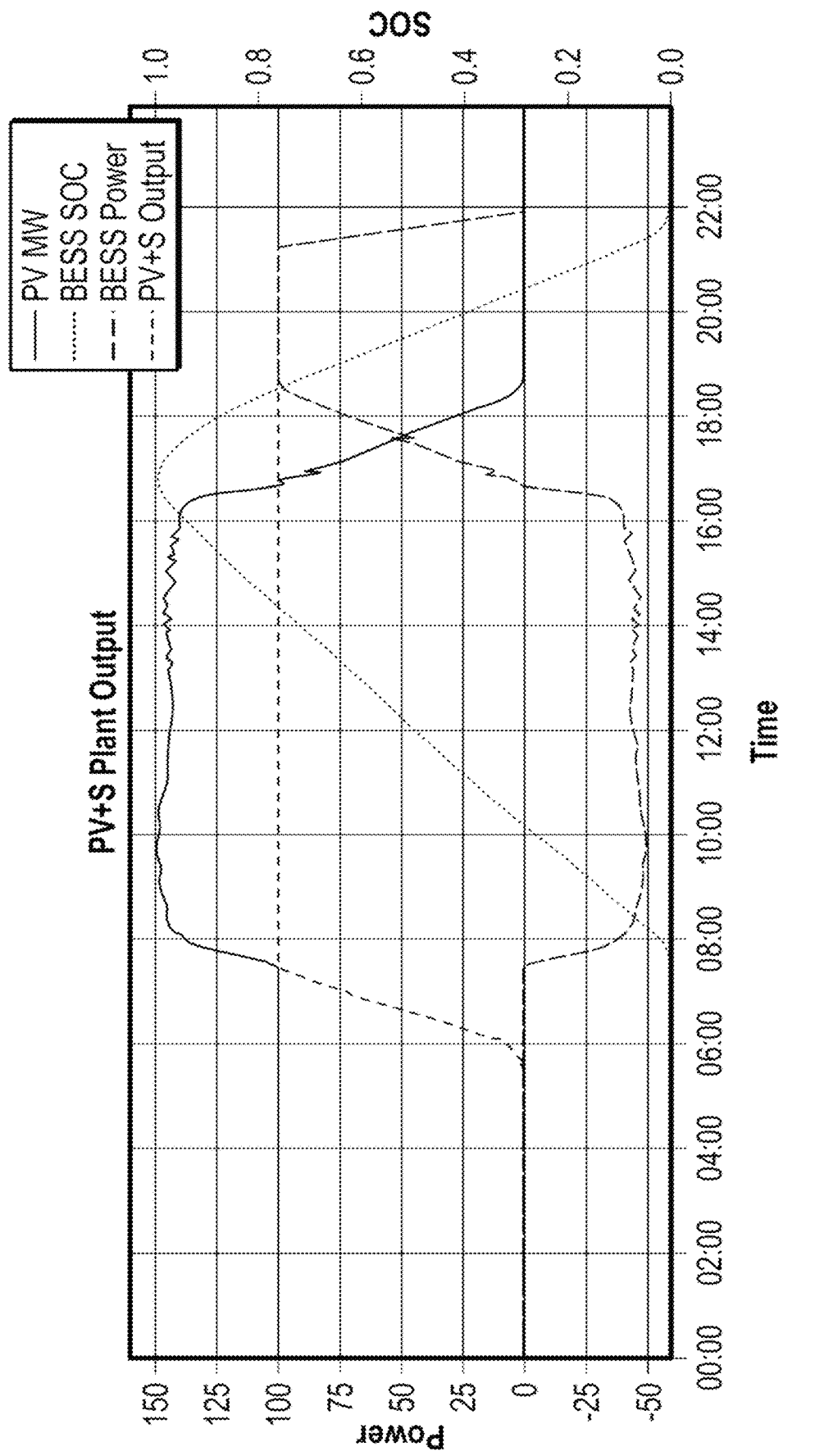
FIG. 9B is a modeled output plot for an AC overbuilt RES-ESS facility having power inverter capacity that exceeds a point of grid interconnect limit according to one embodiment of the present disclosure, with superimposed plots of RES production, combined RES-ESS output, state of charge of the ESS, and ESS power output.

Additional differences in operation and performance between a non-overbuilt RES-ESS facility and an AC overbuilt RES-ESS facility may be understood upon comparison of FIGS. 9A and 9B.

FIG. 9A is a modeled output plot for an AC-coupled RES-ESS facility having power inverter capacity matched to a point of grid interconnect limit. FIG. 9A provides superimposed plots of RES production (i.e., photovoltaic or "PV"), combined RES-ESS output (i.e., PV plus storage or "PV+S" output), ESS power output (i.e., "BESS power"), and ESS state of charge (i.e., "BESS SOC"). As shown, maximum PV production of 100 MW is achieved from about 08:00 to about 16:30, with a portion of this production being used to charge the ESS (as evidenced by the rising SOC value and the negative ESS power output) during this period. When RES production starts to fall and maximum SOC is attained around 16:00, control of the ESS is switched from a charging mode to a discharging mode, and output of the ESS is converted to AC to supply power to the grid. Combined RES-ESS output of 100 MW equal to the POGI limit is achieved for about 4.5 hours, from 16:00 to about 20:30, and then drops to zero by 21:00, thereby readying the ESS to be charged the next day.

FIG. 9B is a modeled output plot for an AC overbuilt RES-ESS facility having power inverter capacity that significantly exceeds a point of grid interconnect limit according to one embodiment of the present disclosure. FIG. 9B provides superimposed plots of RES production (i.e., photovoltaic or "PV"), combined RES-ESS output (i.e., PV plus storage or "PV+S" output), ESS power output (i.e., "BESS power"), and ESS state of charge (i.e., "BESS SOC") for a facility having a POGI limit of 100 MW. As shown, maximum PV production of about 150 MW is achieved from about 08:00 to about 16:30, with a portion of this production being used to charge the ESS (as evidenced by the rising SOC value and the negative ESS power output) during this period. When RES production starts to fall and maximum SOC is attained around 16:00, control of the ESS is switched from a charging mode to a discharging mode, and output of the ESS is converted to AC to supply power to the grid. Combined RES-ESS output of 100 MW equal to the POGI limit is achieved for more than about 13 hours, from before 08:00 to about 21:00, and then drops to zero by 22:00, thereby readying the ESS to be charged the next day. Presence of a high-capacity ESS and oversized inverter capacity (exceeding the POGI limit) permits excess energy produced by the ESS array (i.e., power in excess of the POI limit) to be stored, and permits the PV+S output to function similarly to a baseload unit between about 08:00 to about 21:00 by providing a fixed firm capacity during this period.

B. RES-ESS Control Method Mode Using SOC Target-Based POGI Cap

One aspect of the present disclosure is directed to a method for controlling a RES-ESS facility that uses a time-dependent forecast of electrical energy production by the RES and a state of charge (SOC) schedule for the ESS to calculate a SOC target-based POGI cap that is less than the (predetermined fixed) POGI limit, with the SOC target-based POGI cap representing a peak power output value for the RES-ESS facility that is as low as possible while still ensuring that the SOC schedule is satisfied. The method further comprises using the SOC target-based POGI cap in conjunction with the time-dependent forecast of electrical energy production by the RES and the state of charge (SOC) schedule for the ESS to generate a time-varying charge/discharge control signal for the ESS, with the control signal being configured to ensure satisfaction of the SOC schedule.

The SOC target-based POGI cap represents a suggested peak power limit threshold that maximizes headroom (e.g., spinning reserve capacity) of a RES-ESS facility, thereby enhancing the ability of the RES-ESS facility to provide ancillary services (and to charge a grid operator for providing ancillary services). In practice, the grid operator may choose to set (and utilize) the SOC target-based POGI cap.

In certain embodiments, a method comprises: utilizing (A) a time-dependent forecast of electrical energy production by the RES and (B) a state of charge (SOC) schedule to calculate a SOC target-based POGI cap that is less than the POGI limit, wherein the SOC target-based POGI cap represents a peak power output value for the RES-ESS that is as low as possible while still ensuring that the SOC schedule is satisfied; and utilizing (A) the time-dependent forecast of electrical energy production by the renewable electrical energy generation resource, (B) the state of charge (SOC) schedule for the electrical energy storage device including at least one SOC target value, and (C) the SOC target-based POGI cap, to generate a time-varying charge/discharge control signal for the ESS, wherein the time-varying charge/discharge control signal is configured to ensure that the SOC schedule is satisfied.

In certain embodiments, a SOC target-based POGI cap may be estimated using an optimization algorithm to solve for an optimal upper threshold such that the amount of energy charged is equal to the required energy to reach a maximum value of the SOC in a specified period, wherein the maximum value may be termed the Maximum State of Energy. In particular, the method may involve solving for x (representing the SOC target-based POGI cap) such that:

$$\sum_{i=1}^{n}(PV \text{ Forecast Power}[Power > x])(Wh) - x \times n(Wh) == \text{Max State of Energy}(Wh)$$

wherein:
'n' is the number of forecasted power values in a target interval;
'x' is the SOC target-based POGI cap (threshold); and
Max State of Energy is a function of the configurable Max SOC parameter.

In certain embodiments, the SOC target-based POGI cap may be generated using a computer-implemented, iterative root-finding algorithm. One non-limiting example is the Newton-Raphson method. In certain embodiments, the SOC target-based POGI cap may be generated using a computer-implemented, matrix-based root-finding algorithm.

Figure 10:
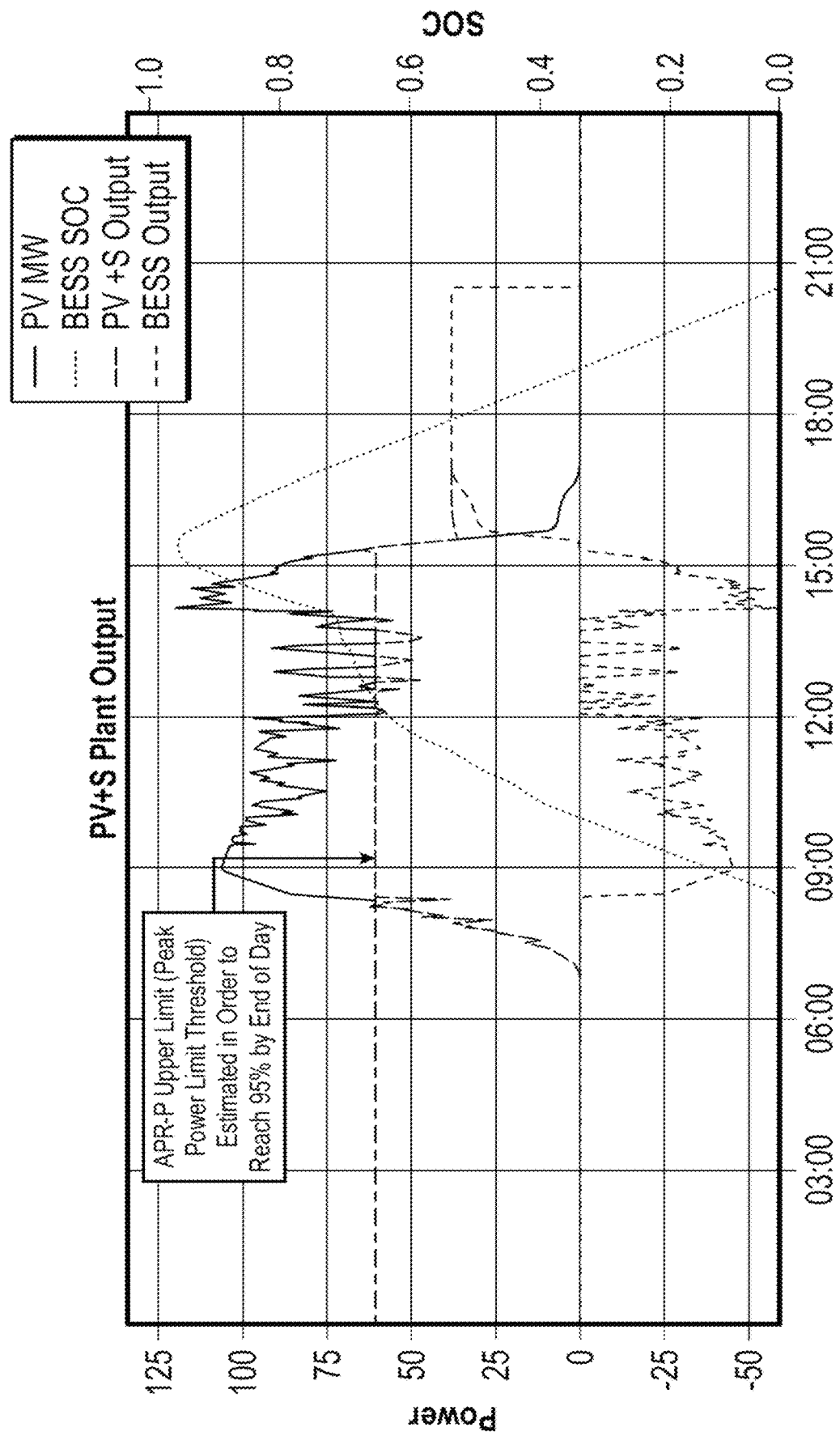
FIG. 10 is a modeled output plot for an AC overbuilt RES-ESS facility having power inverter capacity that exceeds a point of grid interconnect limit according to one embodiment of the present disclosure, showing results of utilizing a SOC target-based POGI cap, with superimposed plots of RES production, combined RES-ESS output, state of charge of the ESS, and ESS power output.

Results of utilizing a SOC target-based POGI cap are shown in FIG. 10, which is a modeled output plot for an AC overbuilt RES-ESS facility having power inverter capacity that exceeds a point of grid interconnect limit according to one embodiment of the present disclosure, with superimposed plots of RES production, combined RES-ESS output, state of charge of the ESS, and ESS power output. FIG. 10 shows a result of calculating a SOC target-based POGI cap (also termed Peak Power Limit threshold in FIG. 10) that provides a SOC of 95% of capacity before the end of a day.

In certain embodiments, a method involving a SOC target-based POGI cap further comprises periodically updating the generation of the time-varying charge/discharge control signal based upon at least one of the following items (i) or (ii): (i) an updated time-dependent forecast of electrical energy production; or (ii) an updated SOC schedule.

In certain embodiments, the method further comprises periodically updating the generation of the time-varying control signal upon expiration of a refresh period, wherein the periodic updating comprises computing and using a new basepoint value for aggregated energy supplied from the renewable electrical energy generation resource and the electrical energy storage device to an electrical grid upon expiration of the refresh period. In certain embodiments, the refresh period is configurable, and the time-varying charge/discharge control signal is permitted to change no more than once per refresh period. In certain embodiments, the time-varying charge/discharge control signal is permitted to change only once within a configurable refresh period, to keep aggregated power output of a RES-ESS facility constant during the refresh period, thereby enabling participation in energy markets and/or energy balance markets. In certain embodiments, the refresh period is configurable by an operator of the RES-ESS facility.

In certain embodiments, the electrical energy storage device is charged exclusively from the renewable electrical energy generation resource.

In certain embodiments, the method further comprises altering the time-varying charge/discharge control signal responsive to a difference between forecasted production and actual production of at least one electric generation facility to ensure that the SOC schedule is satisfied.

In certain embodiments, the time-dependent forecast of electrical energy production comprises an ensemble based on of two or more of the following: on-site sky imaging, satellite imaging, and meteorological modeling.

In certain embodiments, wherein the time-dependent forecast of electrical energy production comprises a refresh rate that determines how often a new basepoint value for aggregated photovoltaic plus storage energy supplied to an electric grid (PV+S output basepoint value) is computed. In certain embodiments, a pre-existing PV+S Output value is used until a new PV+S output basepoint value is computed.

In certain embodiments, the renewable electrical energy generation resource comprises a photovoltaic array, the electrical energy storage device comprises a battery array, and the time-dependent forecast of electrical energy production comprises a solar production forecast.

In certain embodiments, the renewable electrical energy generation resource comprises at least one wind turbine, the electrical energy storage device comprises a battery array, and the time-dependent forecast of electrical energy production comprises a wind production forecast.

Figure 11:
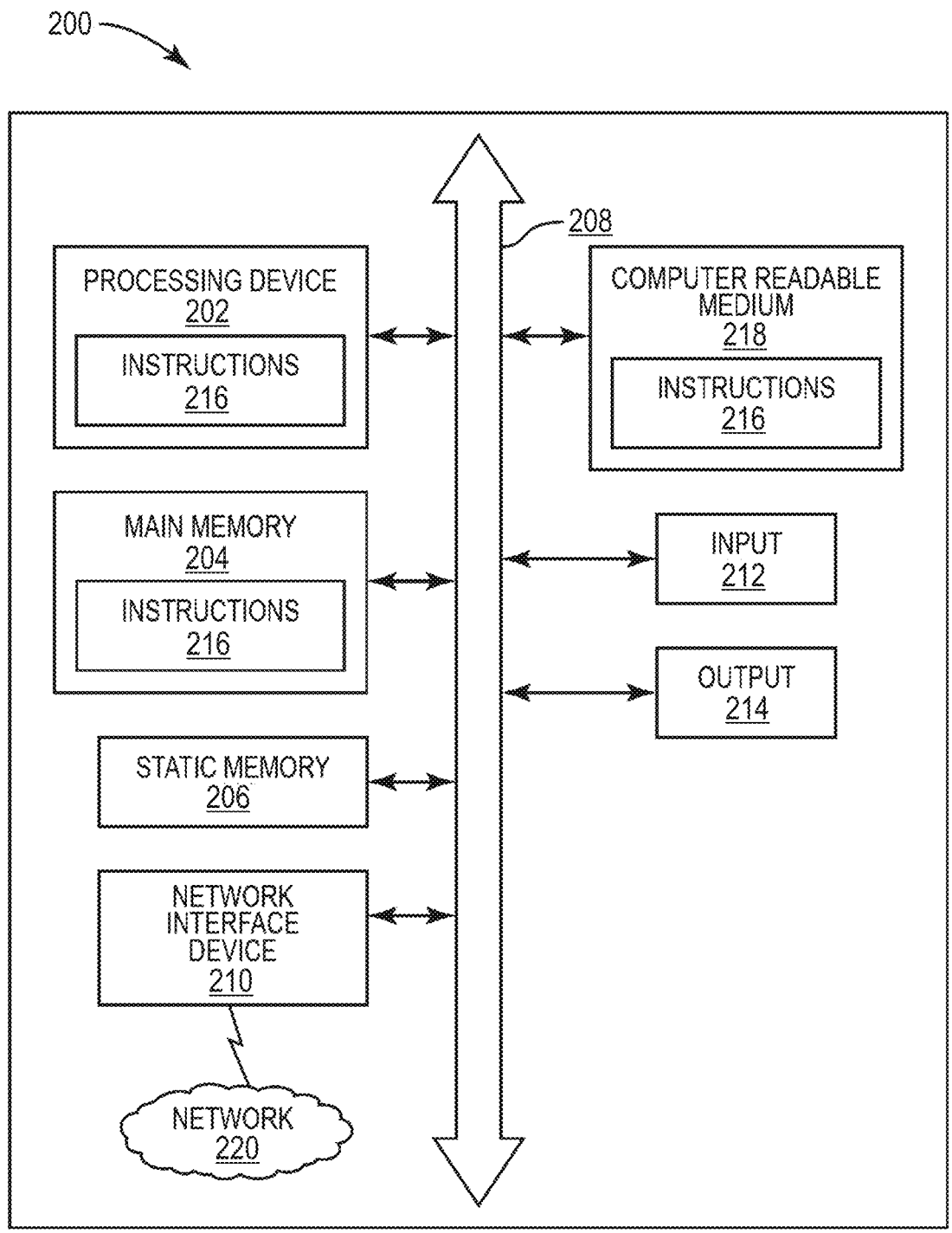
FIG. 11 is a schematic diagram of a generalized representation of a computer system that can be included as one or more components of a system for controlling a RES-ESS facility according to one embodiment of the present disclosure.

FIG. 11 is schematic diagram of a generalized representation of a computer system 200 that can be included as one or more components of a system for controlling a renewable electrical energy generation resource and an electrical energy storage device chargeable with electric power produced by the renewable electrical energy generation resource, according to one embodiment. The computer system 200 may be adapted to execute instructions from a computer-readable medium to perform these and/or any of the functions or processing described herein.

The computer system 200 may include a set of instructions that may be executed to program and configure programmable digital signal processing circuits for supporting scaling of supported communications services. The computer system 200 may be connected (e.g., networked) to other machines in a local area network (LAN), an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 200 may be a circuit or circuits included in an electronic board or card, such as a printed circuit board (PCB), a server, a personal computer, a desktop computer, a laptop computer, a personal digital assistant (PDA), a computing pad, a mobile device, or any other device, and may represent, for example, a server or a user's computer.

The computer system 200 in this embodiment includes a processing device or processor 202, a main memory 204 (e.g., read-only memory (ROM), flash memory, dynamic random access memory (DRAM), such as synchronous DRAM (SDRAM), etc.), and a static memory 206 (e.g., flash memory, static random access memory (SRAM), etc.), which may communicate with each other via a data bus 208. Alternatively, the processing device 202 may be connected to the main memory 204 and/or static memory 206 directly or via some other connectivity means. The processing device 202 may be a controller, and the main memory 204 or static memory 206 may be any type of memory.

The processing device 202 represents one or more general-purpose processing devices, such as a microprocessor, central processing unit (CPU), or the like. In certain embodiments, the processing device 202 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 202 is configured to execute processing logic in instructions for performing the operations and steps discussed herein.

The computer system 200 may further include a network interface device 210. The computer system 200 may additionally include at least one input 212, configured to receive input and selections to be communicated to the computer system 200 when executing instructions. The computer system 200 also may include an output 214, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 200 may or may not include a data storage device that includes instructions 216 stored in a computer readable medium 218. The instructions 216 may also reside, completely or at least partially, within the main memory 204 and/or within the processing device 202 during execution thereof by the computer system 200, the main memory 204 and the processing device 202 also constituting computer readable medium. The instructions 216 may further be transmitted or received over a network 220 via the network interface device 210.

While the computer readable medium 218 is shown in an embodiment to be a single medium, the term "computer-readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding, or carrying a set of instructions for execution by the processing device and that cause the processing device to perform any one or more of the methodologies of the embodiments disclosed herein. The term "computer readable medium" shall accordingly be taken to include, but not be limited to, solid-state memories, an optical medium, and/or a magnetic medium.

In certain embodiments, systems and apparatuses disclosed herein may utilize a non-transitory computer readable medium containing program instructions for controlling, by at least one processor, (i) a renewable electrical energy generation resource and (ii) an electrical energy storage device chargeable with electric power produced by the renewable electrical energy generation resource, the method comprising utilizing, by the at least one processor, (A) a time-dependent forecast of electrical energy production by the RES and (B) a state of charge (SOC) schedule to calculate a SOC target-based POGI cap that is less than the POGI limit, wherein the SOC target-based POGI cap represents a peak power output value for the RES-ESS that is as low as possible while still ensuring that the SOC schedule is satisfied. The method further comprises utilizing, by the at least one processor, (A) the time-dependent forecast of electrical energy production by the renewable electrical energy generation resource, (B) the state of charge (SOC) schedule for the electrical energy storage device including at least one SOC target value, and (C) the SOC target-based POGI cap, to generate a time-varying charge/discharge control signal for the ESS, wherein the time-varying charge/discharge control signal is configured to ensure that the SOC schedule is satisfied.

In certain embodiments, the program instructions contained in the computer readable medium may be configured to perform additional method steps as disclosed herein.

C. Method for Implementing Power Delivery Transaction for Potential RES-ESS Output As noted previously herein, if renewable energy producers are rewarded for energy generation alone, these producers may be discouraged from providing ancillary services. Additionally, the capital expenses for developing the projects are typically amortized over the expected generation, and investors of these projects need certainty in the expected generation in order to contribute capital for project funding. To address these issues, one aspect of the present disclosure is directed to a method for implementing a power delivery transaction between a buyer and seller for potential electrical energy output of a RES-ESS facility. Such a method includes periodically estimating total potential electrical energy output of the RES during at least one retrospective time windows utilizing a signal indicative of one or more sensed parameters. The method further includes comparing the total potential electrical energy output of the RES to a POGI limit for the facility to identify potential RES overgeneration during the time window(s), and identifying an amount of charged potential RES overgeneration that was charged to the ESS during the time window(s). The method further includes charging the buyer for undelivered electrical energy if charged potential RES overgeneration is less than potential RES overgeneration during the time window(s). Such a method is specifically intended to give RES-ESS investors certainty in expected revenues by metering potential generation above a POGI limit.

The method provides a financial incentive for a utility (or other grid operator) to discharge an ESS each day so that the ESS is empty by the next morning and ready to accept a full charge again. The method permits estimation of an amount of energy that could have been stored in an ESS, but was not stored if the utility or grid operator did not fully discharge the ESS. Such a method further provides a basis for the RES-ESS facility owner to be paid for the estimated amount of energy that did not get stored as a result of the utility or grid operator not fully discharge the ESS prior to the start of a new day. Implementation of such a method provides an incentive for investors to support construction of AC-overbuilt RES-ESS facilities without hampering flexibility of grid operators to control generation resources, by ensuring certainty of a revenue stream to the RES-ESS facility even if the utility elects not to fully discharge an ESS.

In certain embodiments, a method for implementing a power delivery transaction between a buyer and seller for potential electrical energy output of an integrated renewable energy source and energy storage system (RES-ESS) facility comprises: periodically estimating total potential electrical energy output of the RES during at least one retrospective time window utilizing a signal indicative of one or more sensed parameters; comparing the estimated total potential electrical energy output of the RES to a point of grid interconnect (POGI) limit for the RES-ESS facility to identify potential RES overgeneration during the at least one retrospective time window, wherein potential RES overgeneration equals potential RES electrical energy output in excess of the POGI limit during the at least one retrospective time window; identifying an amount of charged potential RES overgeneration, calculated as potential RES overgeneration charged to the ESS during the at least one retrospective time window; and charging the buyer for undelivered electrical energy if charged potential RES overgeneration is less than potential RES overgeneration during one or more time windows of the at least one retrospective time window.

In certain embodiments, the method further comprises identifying an amount of uncharged potential RES overgeneration, calculated as potential RES overgeneration not charged to the ESS during the at least one retrospective time window; wherein an amount charged to the for undelivered electrical energy is based on a deemed delivered RES overgeneration value that is identified according to the following logical sequence: (i) if potential RES overgeneration equals zero, then the deemed delivered RES overgeneration value equals zero, else (ii) if charged potential RES overgeneration is greater than or equal to potential RES overgeneration, then the deemed delivered RES overgeneration value equals zero, else (iii) if charged RES overgeneration is less than potential RES overgeneration, then the deemed delivered RES overgeneration value equals the lesser of the following items (a) and (b): (a) uncharged potential RES overgeneration, and (b) potential RES overgeneration minus charged RES overgeneration.

In certain embodiments, the at least one retrospective time window comprises a plurality of time periods. In certain embodiments each time period of the plurality of time periods is less than one hour (e.g., each time period may be five minutes, one minute, or another suitable interval).

In certain embodiments, the one or more time windows comprises a summation of multiple time windows of the at least one retrospective time window. In certain embodiments, the summation of multiple time windows corresponds to a period of one day.

In certain embodiments, the RES comprises a photovoltaic array, and the one or more sensed parameters comprise irradiance sensed at one or more locations at the RES-ESS facility.

In certain embodiments, the RES comprises one or more wind turbines, and the one or more sensed parameters comprise wind speed sensed at one or more locations at or above the RES-ESS facility.

In certain embodiments, the RES-ESS facility is configured to supply energy to an electrical grid at a voltage of at least 33 kV or at least 66 kV. In certain embodiments, the ESS is configured to be changed exclusively from the RES.

In certain embodiments, a RES may be oversized relative to a corresponding ESS of a RES-ESS facility, to ensure that the RES can fully charge the ESS (e.g., for a RES embodying a PV array in winter or in a season when more clouds are expected). The potential excess production from the RES might exceed the full energy capacity of the ESS. In such an instance, a maximum limit may be set on the calculated potential excess energy production from the RES per day, set by the capacity of the ESS, so that the buyer would not be charged for potential overgeneration in excess of could be absorbed by the ESS can absorb. This maximum limit would still allow charging for potential energy the RES could have produced, but that was not stored in the ESS because the buyer had not discharged the ESS from the previous day In such an instance, the method may further comprise capping an amount of charged potential RES overgeneration based on a capacity of the ESS, if the potential RES overgeneration exceeds a capacity of the ESS.

While specific aspects, features and illustrative embodiments have been disclosed herein, it will be appreciated that the disclosure extends to and encompasses numerous other variations, modifications, and alternative embodiments, as will suggest themselves to those of ordinary skill in the pertinent art, based on the disclosure herein. Various combinations and sub-combinations of the structures described herein are contemplated and will be apparent to a skilled person having knowledge of this disclosure. Any of the various features and elements as disclosed herein may be combined with one or more other disclosed features and elements unless indicated to the contrary herein. Correspondingly, the invention as hereinafter claimed is intended to be broadly construed and interpreted, as including all such variations, modifications, and alternative embodiments, within its scope and including equivalents of the claims.

What is claimed is:

1. An energy management system comprising:
    a renewable energy source (RES) configured to produce a first amount of electric power and having a power generation capacity exceeding a maximum electric power value to be supplied to an electric grid;
    a first inverter coupled to the RES, wherein the first inverter is configured to modulate the first amount of power;
    an energy storage system (ESS) configured to selectively receive a portion of the first amount of electric power from the RES to charge the ESS and discharge the ESS to supplement the first amount of power, wherein the ESS has a power capacity equal to or greater than a difference between the first amount of power and the maximum electric power value to be supplied to the electric grid; and
    a second inverter coupled to the ESS, wherein the second inverter is configured to modulate an output of the ESS; and
    a controller configured to control (1) the first inverter and (2) the second inverter such that an amount of power provided to the electric grid does not exceed the maximum electric power value to be supplied to the electric grid.

2. The energy management system of claim 1, wherein the controller is configured to control the first inverter and the second inverter based at least in part on a forecast signal comprising a time-dependent forecast of energy production of the RES.

3. The energy management system of claim 2, wherein the time-dependent forecast of energy production of the RES is based at least in part on (a) data from a sky imaging sensor associated with an RES-ESS facility, (b) data from a satellite imaging sensor, or (c) meteorological data.

4. The energy management system of claim 1, wherein the controller is further configured to control the first inverter and second inverter based at least in part on a state of charge (SOC) schedule of the ESS.

5. The energy management system of claim 1, wherein the RES, the ESS, the first inverter, and the second inverter are sized based at least in part on long-term weather data.

6. The energy management system of claim 1, wherein the power capacity of the first inverter is sized based at least in part on (i) the maximum electric power value to be supplied to the electric grid, and (ii) the power capacity of the ESS.

7. The energy management system of claim 1, wherein the RES and ESS are configured to supply power to the electric grid at a fixed firm capacity that is a ratio of the maximum electric power value to be supplied to the electric grid for a predefined duration.

8. A method comprising:
    receiving, at a controller, a first indication of a maximum electric power value to be supplied to an electric grid;
    receiving, at the controller, a second indication of electric power from a renewable energy source (RES), wherein the RES has a maximum generation capacity exceeding the maximum electric power value to be supplied to the electric grid;
    controlling, at the controller, a first inverter coupled to the RES to modulate a first amount of power from the RES to supply to the electric grid based on the received first indication and the received second indication; and
    controlling, at the controller, a second inverter coupled to the ESS to modulate a charge/discharge rate of the ESS and selectively (1) supplement the first amount of power from the RES up to the maximum electric power value to be supplied to the electric grid based on the first indication and the second indication and (2) charge the ESS from a portion of the first amount of power based on the first indication and the second indication, wherein the ESS has a power capacity equal to or greater than a difference between the first amount of power and the maximum electric power value to be supplied to the electric grid.

9. The method of claim 8, further comprising receiving, at the controller, a time-dependent forecast of energy production of the RES, and wherein controlling, at the controller, the first inverter and the second inverter is based at least in part on the time-dependent forecast signal.

10. The method of claim 9, further comprising generating the time-dependent forecast based on at least one of (a) data from a sky imaging sensor associated with an RES-ESS facility, (b) data from a satellite imaging sensor, or (c) meteorological data.

11. The method of claim 8, further comprising receiving, at the controller, a state of charge (SOC) schedule of the ESS, and wherein controlling, at the controller, the first inverter and the second inverter is based at least in part on the SOC schedule of the ESS.

12. The method of claim 8, further comprising receiving long-term weather data and sizing the RES, the ESS, the first inverter, and the second inverter based at least in part on the long-term weather data.

13. The method of claim 8, further comprising sizing, at the controller, the power capacity of the first inverter based at least in part on (i) the maximum electric power value to be supplied to the electric grid, and (ii) the power capacity of the ESS.

14. The method of claim 8, further comprising controlling, at the controller, the first inverter and the second inverter to supply power to the grid for a predefined duration at a fixed firm capacity that is a ratio of the maximum electric power value to be supplied to the electric grid.

15. A non-transitory computer-readable storage medium having instructions stored thereon that, upon execution by a processor, cause the processor to perform operations comprising:
    receiving a first indication of a maximum electric power value to be supplied to an electric grid;
    receiving a second indication of electric power from a renewable energy source (RES), wherein the RES has a maximum generation capacity exceeding the maximum electric power value to be supplied to the electric grid;
    controlling a first inverter coupled to the RES to modulate a first amount of power from the RES to supply to the electric grid based on the received first indication and the received second indication; and
    controlling a second inverter coupled to the ESS to modulate a charge/discharge rate of the ESS and selectively (1) supplement the first amount of power from the RES up to the maximum electric power value to be supplied to the electric grid based on the first indication and the second indication and (2) charge the ESS from a portion of the first amount of power based on the first indication and the second indication, wherein the ESS has a power capacity equal to or greater than a difference between the first amount of power and the maximum electric power value to be supplied to the electric grid.

16. The non-transitory computer-readable storage medium of claim 15, wherein the operations further comprise receiving a time-dependent forecast of energy production of the RES and wherein controlling the first inverter and the second inverter is based at least in part on the time-dependent forecast.

17. The non-transitory computer-readable storage medium of claim 16, wherein the operations further comprise generating the time-dependent forecast based on at least one of (a) data from a sky imaging sensor associated with an RES-ESS facility, (b) data from a satellite imaging sensor, or (c) meteorological data.

18. The non-transitory computer-readable storage medium of claim 15, wherein the operations further comprise receiving a state of charge (SOC) schedule of the ESS, and wherein controlling the first inverter and the second inverter is based at least in part on the SOC schedule of the ESS.

19. The non-transitory computer-readable storage medium of claim 15, wherein the operations further comprise receiving long-term weather data and sizing the RES, the ESS, the first inverter, and the second inverter based at least in part on the long-term weather data.

20. The non-transitory computer-readable storage medium of claim 15, wherein the operations further comprise sizing the power capacity of the first inverter based at least in part on (i) the maximum electric power value to be supplied to the electric grid, and (ii) the power capacity of the ESS.

21. The non-transitory computer-readable storage medium of claim 15, wherein the operations further comprise controlling the first inverter and the second inverter to supply power to the grid for a predefined duration at a fixed firm capacity that is a ratio of the maximum electric power value to be supplied to the electric grid.

* * * * *